United States Patent
Archambeau et al.

(10) Patent No.: US 11,977,836 B1
(45) Date of Patent: May 7, 2024

(54) GLOBAL EXPLANATIONS OF MACHINE LEARNING MODEL PREDICTIONS FOR INPUT CONTAINING TEXT ATTRIBUTES

(71) Applicant: Amazon Technologies, Inc., Seattle, WA (US)

(72) Inventors: Cedric Philippe Archambeau, Berlin (DE); Sanjiv Ranjan Das, San Jose, CA (US); Michele Donini, Berlin (DE); Michaela Hardt, Berkeley, CA (US); Tyler Stephen Hill, Los Altos, CA (US); Krishnaram Kenthapadi, Sunnyvale, CA (US); Pedro L Larroy, San Carlos, CA (US); Xinyu Liu, Santa Clara, CA (US); Keerthan Harish Vasist, Sunnyvale, CA (US); Pinar Altin Yilmaz, Palo Alto, CA (US); Muhammad Bilal Zafar, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 330 days.

(21) Appl. No.: 17/535,945

(22) Filed: Nov. 26, 2021

(51) Int. Cl.
- *G06F 7/02* (2006.01)
- *G06F 16/00* (2019.01)
- *G06F 16/22* (2019.01)
- *G06F 40/20* (2020.01)
- *G06N 5/01* (2023.01)

(52) U.S. Cl.
CPC .......... *G06F 40/20* (2020.01); *G06F 16/2246* (2019.01); *G06N 5/01* (2023.01)

(58) Field of Classification Search
CPC ........ G06F 40/20; G06F 16/2246; G06N 5/01
See application file for complete search history.

(56) References Cited

U.S. PATENT DOCUMENTS

| | | | |
|---|---|---|---|
| 2017/0315984 A1* | 11/2017 | Goyal | G06F 40/30 |
| 2020/0097389 A1* | 3/2020 | Smith | G06F 11/0793 |
| 2020/0410050 A1* | 12/2020 | Cason | G06F 40/205 |
| 2021/0390457 A1* | 12/2021 | Romanowsky | G06N 5/04 |

OTHER PUBLICATIONS

Daniel Jurafsky & James H. Martin, "Constituency Grammars", Chapter 12, Speech and Language Processing, Copyright © 2021. All rights reserved. Draft of Sep. 21, 2021, pp. 1-30.
U.S. Appl. No. 17/106,021, filed Nov. 27, 2020, Sanjiv Das, et al.
U.S. Appl. No. 17/106,029, filed Nov. 27, 2020, Sanjiv Das, et al.

(Continued)

*Primary Examiner* — Bruce M Moser
(74) *Attorney, Agent, or Firm* — Robert C. Kowert; Kowert, Hood, Munyon, Rankin & Goetzel, P.C.

(57) ABSTRACT

A determination is made that an explanatory data set for a common set of predictions generated by a machine learning model for records containing text tokens is to be provided. Respective groups of related tokens are identified from the text attributes of the records, and record-level prediction influence scores are generated for the token groups. An aggregate prediction influence score is generated for at least some of the token groups from the record-level scores, and an explanatory data set based on the aggregate scores is presented.

20 Claims, 20 Drawing Sheets

(56) References Cited

OTHER PUBLICATIONS

U.S. Appl. No. 17/106,027, filed Nov. 27, 2020, Sanjiv Das, et al.
U.S. Appl. No. 17/535,909, filed Nov. 22, 2021, Ashish Rajendra Rathi, et al.
U.S. Appl. No. 17/535,932, filed Nov. 26, 2021, Xiaoguang Chen.
U.S. Appl. No. 17/535,912, filed Nov. 26, 2021, Cedric Philippe Archambeau.
U.S. Appl. No. 17/535,942, filed Nov. 26, 2021, Cedric Philippe Archambeau.
U.S. Appl. No. 17/535,946, filed Nov. 26, 2021, Cedric Philippe Archambeau.
7924-51200—U.S. Appl. No. 17/535,908, filed Nov. 26, 2021, Krishnaram Kenthapadi, et al.
7924-52100—U.S. Appl. No. 17/535,929, filed Nov. 26, 2021, Cedric Philippe Archambeau, et al.
U.S. Appl. No. 17/106,013, filed Nov. 27, 2020, Sanjiv Das, et al.

\* cited by examiner

Input text attribute 400 → *The strongest rain ever recorded in CountryA shut down the financial hub of CityB, snapped communication lines, closed airports and forced thousands of people to sleep in their offices or walk home during the night, officials said.*

Conventional chunking algorithm 410 (e.g., to generate meaningful related groups of tokens such as noun phrases, web phrases etc.)

*Conventional chunking can lead to token groups of very short lengths, which may not be very useful for explaining machine learning model predictions*

Chunk list 414

| | |
|---|---|
| NP (noun phrase) | The strongest rain |
| ADVP (adverb phrase) | ever |
| VP (verb phrase) | recorded |
| PP (prepositional phrase) | in |
| NP | CountryA |
| VP | shut |
| PRT (particle) | down |
| NP | the financial hub |
| PP | of |
| NP | CityB |
| VP | snapped |
| NP | communication lines |
| NP | closed airports |
| VP | forced |
| NP | thousands |
| PP | of |
| NP | people |
| VP | to sleep |
| PP | in |
| NP | their offices |
| VP | walk |
| ADVP | home |
| PP | during |
| NP | the night |
| NP | officials |
| VP | said |

*FIG. 4*

From sentences of a data record's text attribute, generate a respective parse tree representation (such as a constituency tree) e.g., using a transformer based model like the Berkeley neural parser; each leaf node in the initial tree corresponds to a text token, and non-leaf nodes at intermediate layers of the tree represent semantically or grammatically related token groups   601

Prune the tree for a sentence using a bottom up traversal, merging adjacent or nearby nodes according to a set of heuristics, e.g., until all the leaf nodes of the pruned version represent examples of only a small set of token group types such as noun phrases and verb phrases; the heuristics can also include exceptions to the default merging rule such as "do not merge two adjacent token groups if they are separated by punctuation symbols such as commas or dashes" and "do not merge two adjacent token groups if they are separated by a coordinating conjunction, a subordinating conjunction or a preposition"; optionally, combine token groups of the pruned version whose token count is less than a threshold N (e.g., single-token noun phrases) with a subsequent token group   604

Create a list of the unique semantically related token groups that remain after pruning algorithm terminates   607

Compute, e.g., using Shapley-based techniques, respective prediction influence scores for each of the semantically related token groups to obtain record-level prediction influence scores   610

FIG. 6

Record-level explanation example 1001 using in-place highlighting

Interface 1077

Phrases in text attribute <TA> that contributed most to the prediction result <P> for record <R> are highlighted in red in the text attribute contents below; phrases that also contributed substantially are highlighted in yellow. To view the attribution scores hover your mouse over the phrases.
1004

Red highlighting 1002

Word1 word2 word3 word4 word5 word6 word7. Word8 word9 word11 word12 word13 word14 word15 word16. Word17 word18 word19 word20. Word21 word22 word23 word24..... Word500 word501 word502.

Yellow highlighting 1003

Record-level explanation example 1101 using heat map

Interface 1177

The following heat map shows the relative influence of different portions of text attribute <TA> on prediction <P> for record <R>. Darker colors show greater influence. Hover over the text to see scores.

1104

Heat map 1107: token groups have background colors and/or font colors representing "heat" (influence) levels

| Word1 word2 word3 | word4 word5 | word6 word7 |
| Word8 word9 | word11 word12 word13 word14 |
| word15 word16 | Word17 word18 word19 word20 |
| ..... Word500 word501 word502. |

*FIG. 11*

Record-level explanation example 1201 using phrase cloud

Interface 1277

The following phrase cloud shows the relative influence of different phrases of text attribute <TA> on prediction <P> for record <R>. Larger sizes show greater influence. Hover over the text to see scores.

1204

Phrase cloud 1207

Word444 word445  Word42 word43
Word54 word55  Word1 word2  Word322  Word321  Word98 word99
Word7 word8  Word222 word223
Word111 word112
Word34 word35 word36 word37
Word78 word79 word80

*FIG. 12*

| Token group 1502 (grouping granularity selected by client) | Baseline profile prediction influence scores 1504 | Time window TW1 post-deployment prediction influence scores 1506A | Time window TW2 post-deployment prediction influence scores 1506B |
|---|---|---|---|
| Word6 word7 word8 | 0.20 | 0.18 | 0.04 |
| Word67 word68 | 0.10 | 0.11 | 0.25 |
| Word33 word34 word35 | 0.05 | 0.05 | 0.45 |

In time window TW1, there is a relatively small deviation from the baseline behavior, so no notification is required In time window TW2, there is a much larger deviation from the baseline behavior, so an alarm may be raised

FIG. 15

Determine, e.g., based on client input, a tracking target bias metric *b* (e.g., difference in positive proportion in predicted labels (DPPL)), a time window size *t*, an acceptable range *r* for the bias metric, a number of bootstrap iterations *n* and a fraction *f* to be used to sample the predictions in a time window   1901

↓

Compute *b* using the *p* model predictions generated in a particular time window   1904

↓

Compute the bootstrap standard deviation *sigma* of *b* by drawing samples of fraction *f* * *p*, *n* times   1907

↓

Compute the 95% confidence interval $C = [\, b - 2*sigma, b + 2*sigma\,]$   1913

↓

If *C* and *r* do not overlap, the drift in bias is statistically significant (even if the number of predictions generated in the time window is small) and an alarm can be raised   1916

*FIG. 19*

GLOBAL EXPLANATIONS OF MACHINE LEARNING MODEL PREDICTIONS FOR INPUT CONTAINING TEXT ATTRIBUTES

BACKGROUND

Machine-learned models and data-driven systems have been increasingly used to help make decisions in application domains such as financial services, healthcare, education, and human resources. These applications have provided benefits such as improved accuracy, increased productivity, and cost savings. This trend is the result of a confluence of factors, such as ubiquitous connectivity, the ability to collect, aggregate, and process large amounts of fine-grained data using cloud computing, and improved access to increasingly sophisticated machine learning models that can analyze this data.

BRIEF DESCRIPTION OF DRAWINGS

FIG. 4 illustrates examples of token groups which may be generated from a text attribute of a machine learning input data record using conventional chunking algorithms, according to at least some embodiments.

FIG. 6 is a flow diagram illustrating aspects of operations that may be performed to generate prediction influence scores for semantically related token groups by applying a pruning algorithm to a parse tree representation of a text attribute of a machine learning input data record, according to at least some embodiments.

FIG. 10, FIG. 11, FIG. 12 and FIG. 13 collectively illustrate examples of graphical displays of explanatory information pertaining to machine learning predictions generated for input containing text attributes, according to at least some embodiments.

FIG. 15 illustrates an example of the kinds of machine learning model behavior deviation metrics which may be detected and reported, according to at least some embodiments.

FIG. 19 is a flow diagram illustrating aspects of operations that may be performed to detect and report post-deployment deviations in bias metrics using bootstrap confidence interval computations, according to at least some embodiments.

Figure 1:
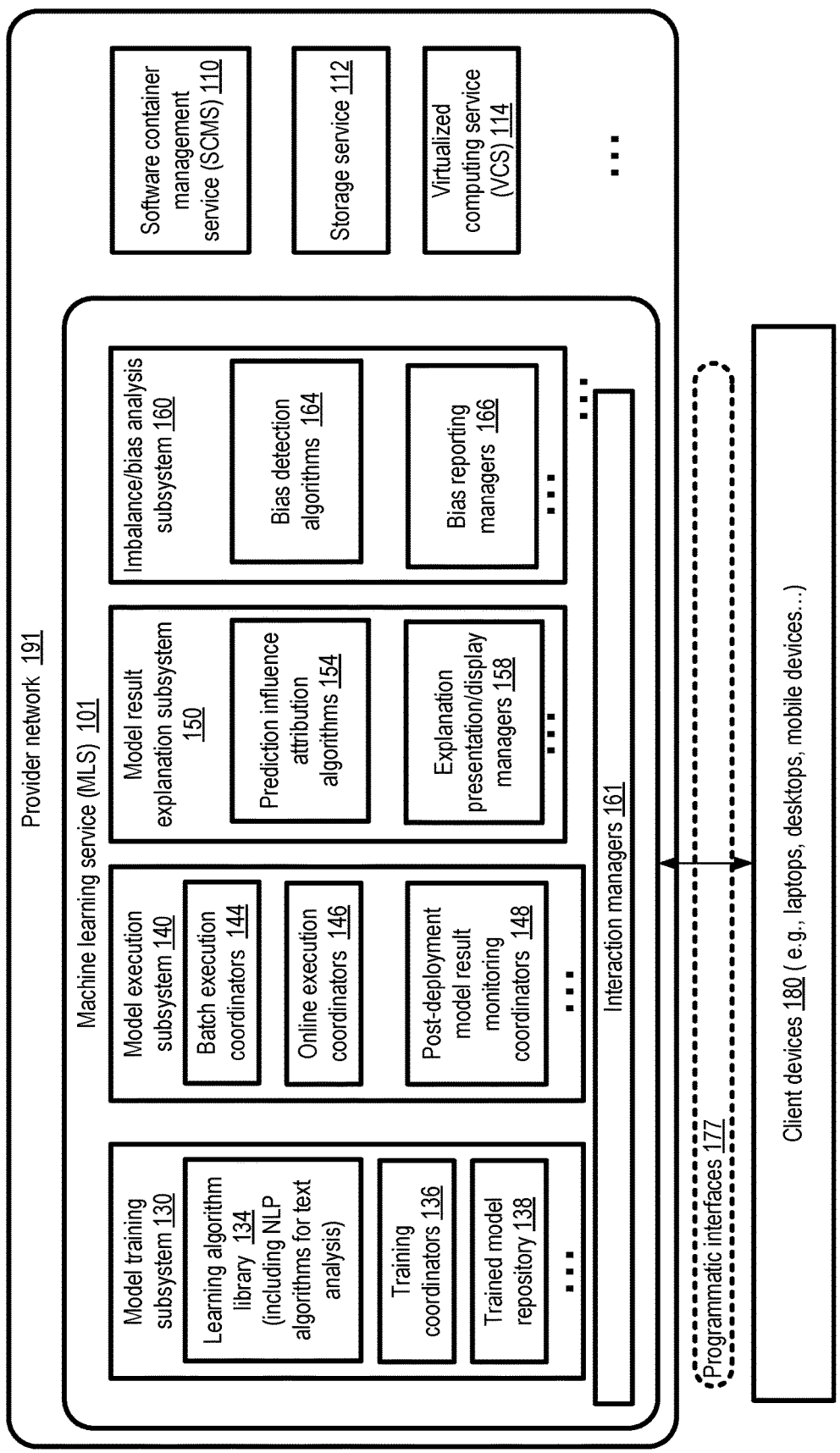
FIG. 1 illustrates an example system environment in which explanatory data sets at various levels of granularity may be generated, and customized behavioral drift analysis may be performed, with respect to prediction results of machine learning models which consume input containing text attributes, according to according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for generating and providing explanatory information at client-specified levels of text granularity, including easy-to-interpret visual explanations, for predictions generated by machine learning models on input containing text attributes.

In addition, the disclosure also relates to methods and apparatus for detecting and reporting on post-deployment drift in various aspects of prediction-related behavior of such machine learning models relative to baseline behavior profile of the models, such as drifts in feature attributions and/or drifts in imbalance or bias metrics. The explanation generation and drift analysis may be performed in at least some embodiments at a network-accessible managed machine learning service (MLS) of a provider network or cloud computing environment, e.g., as part of a larger pipeline of machine learning tasks which incorporates input data processing and analysis, model training, trained model deployment and deployed model execution. In various embodiments the MLS may provide MLS clients programmatic access to software containers or other similar program execution environments, e.g., via a set of application programming interfaces or APIs, and the clients may utilize such APIs to initiate various operations of the pipeline as desired. The MLS clients may not have to concern themselves with operational details such as how to provision or configure the execution environments, scale up (or down) resources used for their machine learning pipeline tasks, parallelize tasks, or manage various types of (typically extremely rare) failures which may occur; instead, the MLS may provide such functionality in its role as a managed service.

Note that with respect to explanations of model predictions, the MLS may in general generate and present explanatory data sets determined using a set of algorithms in various embodiments, and such explanation-related algorithms may themselves be imperfect. As such, the explanatory data sets may only be as good as the underlying algorithms used, and may not necessarily always be able to indicate the actual factors that led to the model's predictions with 100% accuracy (in some cases, it may not necessarily even be possible to determine the actual factors with 100% accuracy). The explanatory data sets may thus often represent estimated explanations or inferred explanations. To simplify the language, in various places in this document, the term "explanation" may nevertheless be used as shorthand for "explanatory data set", or for the phrases "estimated explanation" or "inferred explanation".

To generate the predictions for input containing text attributes, and/or to generate prediction explanations and drift analyses, a variety of natural language processing (NLP) algorithms may be employed in various embodiments. Individual text attributes may in some cases comprise hundreds or even thousands of text tokens such as words (e.g., contents of a multi-page document), and a given input data record for a machine learning model in some cases may itself comprise multiple text attributes. Explanations for the predictions generated by a model for a given input record may require assigning measures of prediction influence to sub-parts of the input record (e.g., indicating estimates of the extent to which each sub-part contributed to the overall prediction). Such measures can also be referred to as feature attribution scores, with each sub-part of the record being considered a feature. Because of the potential for large numbers of tokens in the text attributes, some of which may be repeated several times within a given attribute, across multiple text attributes of an input record, or across attributes of different records of a batch of input records, several problems may naturally arise when attempting to assign prediction influence scores or attributions to text. Such problems may include the following: should prediction influence scores be assigned to individual words, and if so, how useful to human beings are explanations based on word-level influence attribution for records which may contain tens of thousands of words each? If a different granularity for text-based explanations is to be used, what granularity options can be supported, who should make the decisions regarding the granularities used, how is analysis at the different granularities be conducted, and how best is the explanatory information to be presented to be of most use to MLS clients desiring the explanations? Similar granularity-related decisions may also have to be made with respect to the analysis of post-deployment drift in model behavior for text-containing input records. In addition, post-deployment drift analysis may also involve problems of deciding exactly how measures of drift are to be computed, how determinations should be made as to whether a measured drift is significant enough (in a statistical sense) to be reported, and so on. The techniques described herein propose solutions to at least some of these problems in various embodiments, with the overall emphasis being on providing as much flexibility and control to MLS clients as they wish to exercise regarding various parameters of the analysis, and providing potentially complex text-analysis related information to the clients in easy-to-understand formats (such as via visualization interfaces).

As one skilled in the art will appreciate in light of this disclosure, certain embodiments may be capable of achieving various advantages, including some or all of the following: (a) enhancing the transparency and explainability of decisions taken with the help of machine learning models, especially decisions which involve the analysis of large amounts of text, which can in turn lead to increasing confidence in machine learning algorithms in general, (b) reducing the amount of computing, memory, storage, networking and other resources required to provide high quality predictions using machine learning models, e.g., by quickly providing model owners insights into the text-based factors which have greater influence on the models' decisions, which can in turn be utilized to re-train or otherwise enhance the models if needed; and/or (c) reducing the probabilities of sustained occurrences of unbalanced or biased predictions in machine learning model predictions generated using analysis of potentially large amounts of text.

According to some embodiments, a system may comprise one or more computing devices. The computing devices may include instructions that upon execution on or across the computing devices cause the computing devices to obtain, at a service of a provider network, a machine learning model which has been trained to generate respective predictions corresponding to individual data records. A prediction corresponding to an individual data record may be based at least in part on analysis of a text attribute of the record using one or more natural language processing (NLP) algorithms. The text attribute may comprise a plurality of tokens (such as words, punctuation symbols, and the like). At least a first granularity at which an explanation (via an explanatory data set) is to be provided for a particular prediction generated by the model with respect to the text attribute of a particular data record may be determined, e.g., based on input received from a client of the service via a programmatic interface implemented by the service. The first granularity may be a member of a set comprising (a) phrase-level granularity, (b) sentence-level granularity, (c) paragraph-level granularity and/or (d) token-level granularity in some embodiments. As such, the client may choose the granularity at which text-based explanatory information is to be provided in various embodiments.

A plurality of token groups (each comprising one or more tokens) at the first granularity may be generated or extracted from the text attribute of the particular record, e.g., using any of a variety of techniques such as techniques involving heuristic-based pruning of parse-tree representations of the text attribute in various embodiments. A respective prediction influence metric may be generated for individual token groups, for example using a variant of a SHAP (Shapley additive explanation) algorithm. An explanatory data set for the particular prediction may be presented via one or more programmatic interfaces of the service. The explanatory data set may be based at least in part on respective prediction influence metrics of at least a subset of token groups of the plurality of token groups in various embodiments (such as the top K or top K % of token groups in terms of their estimated relative influence on the prediction result). In at least some embodiments, the explanatory data set may be presented via graphical user interfaces or visualizations, using visual cues such as in-place highlighting, font size, font color, heat maps, word clouds or phrase clouds, to indicate the relative magnitudes of the explanatory power/influence of different token groups.

In some embodiments, instead of or in addition to record-level explanatory data sets, global or aggregated explanations for shared or common predictions (e.g., a particular class membership prediction, which may apply to numerous input records) generated for multiple records containing text attributes may be provided. According to one such embodiment, a system may comprise one or more computing devices. The computing devices may include instructions that upon execution on or across the computing devices cause the computing devices to determine, at a service of a provider network, that an explanatory data set for a common prediction generated by a machine learning model with respect to a plurality of data records is to be provided. A prediction corresponding to an individual data record may be based at least in part on analysis of a given text attribute of the data record in various embodiments. The text attribute may in general include a plurality of tokens.

From respective text attributes of the plurality of data records, a respective collection of semantically related token groups (also referred to as grammatically related token groups) may be identified for individual data records in at least some embodiments. Identification of a particular collection of semantically related token groups from the first text attribute of a particular data record may, for example, comprise pruning a parse tree representation (or some other tree based representation) of the text attribute using a set of heuristics. In effect, the semantically related token groups, individual ones of which may typically comprise several tokens (although some single-token groups may also be permitted in some implementations), may be identified to provide explanations that are more likely to be useful and coherent to human beings than explanations based on thousands of individual tokens. To individual ones of the semantically related token groups identified from the particular data record, a respective record-level prediction influence score (RPIS) with respect to the common prediction generated for that particular data record may be assigned in at least some embodiments, e.g., using a variant of a SHAP-based algorithm.

An aggregate prediction influence score (APIS) for a given token group may then be generated from the respective RPISs generated for that token group from the different records which share the common prediction in some embodiments. The aggregation may involve, for example, determining the mean, median, or some other statistic(s) (e.g., a percentile-based function) of the RPISs. An explanatory data set for the common prediction, based at least in part on the APISs of one or more token groups, may be presented via one or more programmatic interfaces of the service in various embodiments. A visualization interface may be used in some embodiments to present the explanatory data set, with various visual cues such as font size, color and the like being used to indicate relative magnitudes of the prediction influences of different token groups.

In some embodiments, a client of an MLS may wish to monitor the behavior of a trained machine learning model after the model is deployed, e.g., in a production environment, and be informed if and when a substantial shift or drift occurs in the model's behavior relative to some earlier reference or baseline set of behaviors. According to at least some embodiments, a system may comprise one or more computing devices. The computing devices may include instructions that upon execution on or across the computing devices cause the computing devices to identify, at a service of a provider network, a set of tracking metrics associated with predictions generated by a machine learning model for input data records. The tracking metrics may include, for example, metrics related to explanations (such as the relative rankings of different input elements with respect to explanatory power), and/or metrics related to imbalance or biases (e.g., metrics which suggest that some classes of input records are potentially being treated unfairly with respect to other classes). Individual ones of the input data records may include at least a first text attribute, and a prediction generated by the machine learning model may based at least in part on a natural language processing analysis of the first text attribute in some embodiments. At least one tracking metric of the set of tracking metrics may computed from the first text attribute in various embodiments using a token group granularity specified by a client of the service via a programmatic interface. The token group granularity may be a member of a set including, for example (a) phrase-level granularity, (b) sentence-level granularity, (c) paragraph-level granularity or (d) token-level granularity.

A group of post-training predictions generated by the machine learning model during a time window may be collected in various embodiments. A metric of deviation (during the time window) of the machine learning model from an earlier-generated baseline profile of the model may be computed based on analysis of the group of post-training predictions in some embodiments. In response to determining that the metric of deviation satisfies a criterion (e.g., if the metric exceeds an acceptable upper bound or is smaller than an acceptable lower bound), an indication that the criterion was satisfied in at least the time window may be presented via one or more programmatic interfaces of the service in one embodiment. In some embodiments, a recommendation for an action directed to reducing the deviation (e.g., re-training the model using an enhanced or more representative training data set) may be provided as well.

In various embodiments in which predictions of explanations or results of post-deployment behavior drift analysis are requested with respect to data sets that contain text attributes, a client of an MLS may optionally provide a list or set of "stop words" via a programmatic interface, indicating tokens (such as frequently-occurring words "and", "or", "from", "by", "to", etc.) which are not to be included in the token groups generated from the records of the data sets. The stop words may be specified, for example, because measuring and obtaining reports on the influences of such common words may not be very useful from the perspective of the client. In some cases, stop words may be specified for particular granularities of token groups—e.g., a client may indicate that the stop word list L1 is to be used for token-level explanations and stop word list L2 (or no stop word list at all) is to be used for phrase-level explanations or sentence-level explanations. In response to receiving such stop word lists, in at least some embodiments, the MLS may verify that the explanatory data sets provided and/or the behavioral drift results presented, do not include or rely on prediction influence scores or imbalance metrics of token groups that include the specified stop words; e.g., stop words may be stripped or removed from the token groups. In at least one embodiment a MLS may use its own list of default stop words (which may be provided to the client if requested) for similar purposes, without receiving the stop words from the client.

FIG. 1 illustrates an example system environment in which explanatory data sets at various levels of granularity may be generated, and customized behavioral drift analysis may be performed, with respect to prediction results of machine learning models which consume input containing text attributes, according to according to at least some embodiments. As shown, system 100 comprises resources and artifacts of several network-accessible services of a provider network 191, including a machine learning service (MLS) 101, a virtualized computing service (VCS) 114, a storage service 112, and a software container management service (SCMS) 110 in the depicted embodiment. The MLS 101 may in turn comprise several subsystems, such as a model training subsystem 130, a model execution subsystem 140, a model result explanation subsystem 150, and an imbalance/bias analysis subsystem 160.

The MLS may implement a set of programmatic interfaces 177 which can be used by MLS clients to submit various requests and messages pertaining to machine learning tasks, and to receive corresponding responses in the depicted embodiment. Such requests may be submitted from a variety of client devices 180, such as laptops, desktops, mobile devices and the like, processed initially at interaction managers 161, and passed on to the appropriate MLS subsystems for further processing by the interaction managers. In some embodiments responses to client-submitted requests (e.g., explanatory data sets and/or indications of detected drift in model behavior) may also be provided via the interaction managers 161. The programmatic interfaces 177 may include, for example, one or more web-based consoles, graphical user interfaces, command-line tools, application programming interfaces (APIs) and the like. Using the programmatic interfaces, tasks corresponding to various stages of a machine learning pipeline of the kind shown in FIG. 2 may be initiated by clients. In at least some embodiments, provider network services other than the MLS itself may be employed for some machine learning tasks coordinated by the MLS—for example, large input data sets used for training machine learning models may be stored at a storage service, software containers used for explanation of model predictions and/or for imbalance analysis may be configured by and/or stored at the SCMS 110 and run on compute instances such as virtual machines acquired by the MLS from the VCS 114, and so on.

The functionality of each of the subsystems of the MLS 101 may be implemented using some combination of hardware and software at a set of computing devices. At the model training subsystem, algorithms from a learning algorithm library 134 (including natural language processing or NLP algorithms for text analysis) may be utilized by one or more training coordinators 136 to generate trained machine learning models using input data sets indicated by MLS clients. The training coordinators 136 may also be responsible for tasks such as processing/transforming raw input data into a format more suitable for consumption by the models, evaluating the trained models, and so on. Some of the models trained at the training subsystem 130 may be used for internal tasks performed within the MLS itself in various embodiments, such as generating explanations of the predictions of client-requested models, analyzing input data as well as trained model results for biases or imbalances, and so on. A set of models trained with the help of the training subsystem may be stored in a trained model repository 138 and executed as desired, e.g., at the request of clients or at the request of other subcomponents of the MLS.

The model execution subsystem 140 may include batch execution coordinators 144, online execution coordinators 146, and post-deployment model result monitoring coordinators 148 in the depicted embodiment. Trained machine learning models may sometimes be executed to obtain inferences or predictions for large groups of input records as part of respective execution jobs; such jobs involving batches of predictions may be orchestrated by batch execution coordinators 144 in the depicted embodiment. In some cases, large execution jobs may be split into multiple parallel sub jobs by the batch execution coordinators, and the results of the different sub-jobs, obtained for example in parallel from respective nodes of a cluster of containers, may be combined by the batch execution coordinators. In contrast to batch jobs, requests to generate predictions for single input data records at a time using trained models may be handled by online execution coordinators 146 (also referred to as real time execution coordinators) in the depicted embodiment. Some MLS clients may wish to monitor the behavior of their trained models after the models have been deployed, e.g., to detect drift in the model's behavior with respect to feature attribution and/or bias/imbalances. Post-deployment model result monitoring coordinators 148 may collect prediction results from deployed trained models according to the preferences of such clients, analyze the results with the help of model result explanation subsystem 150 and/or imbalance/bias analysis subsystem 160, and provide notifications/alarms to the MLS clients if the behavior of the models changes beyond a threshold acceptable level in various embodiments.

Explainable AI (XAI) is a growing field in the machine learning arena. The goals of XAI include providing greater transparency into the working of complex machine learning models, which are often used for decisions that have substantive impacts on peoples' lives but can sometimes remain somewhat opaque. The model result explanation subsystem 150 and the imbalance/bias analysis subsystem 160 may collectively implement various XAI techniques in the depicted embodiment. The model result explanation subsystem 150 may implement a variety of prediction influence attribution algorithms 154 which attempt to estimate the respective influence of various parts of input records or features on a model's predictions. Such attribution may be performed in the depicted embodiment not just for numeric or categorical attributes of input data records, but also for text attribute tokens grouped at a variety of granularities (such as phrase-level, sentence level and/or paragraph level). The granularities at which text-based explanations for model predictions are to be generated may be selected by MLS clients and specified via the programmatic interfaces 177 in some embodiments. Because individual text attributes may potentially contain hundreds or thousands of words, explanation/presentation display managers 158 may organize the text-based prediction influence metrics at the desired granularities into easy-to-understand visualizations, as discussed below in further detail.

Because machine learning models can be shaped by many different factors when used in different application, biased or unbalanced outcomes can occur in ways that may not be easily detectable. For example, in various scenarios, understanding whether a prediction was impacted by any bias, before, during, or after training may be important to prevent potentially discriminatory impact by applications that use the machine learning model in order to address various ethical, policy, and legal concerns. Laws that prohibit discrimination based on "protected attributes" may need to be considered when developing applications that rely upon a machine learning model to ensure compliance with these laws. The model imbalance/bias analysis subsystem may implement numerous bias detection algorithms 164 to detect potential imbalances or unfair treatment of groups represented in the input data, and the bias reporting managers 166 may present the evidence of detected imbalances via the programmatic interfaces 177 in various embodiments.

According to one embodiment, a model which has been trained to generate predictions based on analysis of input records containing one or more text attributes may be obtained at the MLS. In some cases, the model may have been trained at the MLS, while in other cases, the model may have been trained elsewhere and transmitted to the MLS for explainability analysis. The text attributes may each contain a plurality of text tokens which may be analyzes using NLP algorithms to generate the predictions. At least a first granularity at which an explanatory data set is to be provided for a particular prediction generated by the model may be determined at the MLS (e.g., at model result explanation subsystem 150). The first granularity may include, for example, a single token-level granularity, a phrase-level granularity, a sentence-level granularity, a paragraph-level granularity, a chapter section-level granularity, a chapter-level granularity or the like, depending on the size and internal organization of the text attributes involved. In at least some embodiments, the first granularity may be specified by an MLS client via programmatic interfaces 177. In some embodiments, multiple granularities at which explanations should be provided may be chosen by a client. Token groups (each comprising one or more tokens) may be extracted from a text attribute based on the selected granularity (or granularities) in the depicted embodiment. The extraction may involve the construction and pruning of parse trees and/or constituency trees in some embodiments, e.g., to identify clauses/phrases of non-trivial lengths to increase the meaningfulness and coherency of explanations. A respective prediction influence metric or attribution score may be determined for individual ones of the token groups with respect to the prediction generated for the record containing the token groups in various embodiments. An explanatory data set for the prediction may be presented via programmatic interfaces 177. The explanatory data set may be based at least in part on respective prediction influence metrics of at least a subset of the token groups (e.g., the K % most influential token groups) in various embodiments.

In some embodiments, the explanatory data sets may be presented via one or more graphical user interfaces or visualization interfaces of the programmatic interfaces 177, with the visual layout being determined by the explanation presentation/display managers 158 (e.g., based on client input, or based on default explanatory data set layout policies of the MLS). In one such interface, indications of respective prediction influence metrics of the token groups may be shown via in-place highlights—that is, at least some of the text of the attribute may be reproduced in the same order in which the text appeared in the provided input record, and visual cues such as highlighted text, larger fonts etc. may be applied to the more influential token groups to indicate the respective magnitudes of their influence. As such, some tokens of a set of consecutively presented tokens may be highlighted to show that they have higher predictive influence, while other tokens of the consecutively presented tokens may not be highlighted to indicate lower predictive influence.

In at least some embodiments, the token groups may be ranked in order of decreasing predictive influence, and a subset (e.g., the top K or the top K % most highly-ranked token groups) may be selected for inclusion in the subset of token groups represented in the explanatory data set. In one such embodiment, the top-ranked token groups may be listed in order of decreasing prediction influence, while in another embodiment the top-ranked token groups may be shown in the order in which they occur in the original text attribute. In one embodiment, a heat map of the text attribute may be created, in which background colors or other visual cues are used to indicate the relative magnitudes of prediction influence of different token groups. A word cloud or phrase cloud may be used to indicate the relative prediction influences of different token groups in one embodiment, with more influential token groups displayed in larger fonts than less influential token groups. Clients of the MLS may specify, via the programmatic interfaces 177, various parameters pertaining to the explanations, such as the specific data record or prediction for which explanatory data is to be provided, the granularity at which tokens are to be grouped for explanation, the model used for the prediction, the fraction or number of most-highly ranked token groups to be included in the explanations, and/or an explanation presentation methodology (e.g., whether a visualization is to be provided, and if so, what type of visualization techniques such as in-place highlighting, heat maps, word clouds etc. are to be used) in various embodiments. Clients may also be provided access to interface elements (e.g., clickable buttons or drop-down menus) that can be used to switch between the presentation methodologies dynamically in some embodiment. For example, if, after viewing an explanatory data set comprising in-place highlighting, the client wishes to see a word cloud instead, the interface element may be used to change the presentation style. In various embodiments, the MLS may provide a client with access to a software container within which the explanatory data sets can be generated. Any of a variety of explanation generation algorithms, such as variants of SHAP algorithms or gradient-based algorithms may be used to generate the prediction influence metrics in different embodiments.

Instead of requesting an explanation for a single prediction, a client may request a more global explanation for a shared or common prediction generated for multiple data records of an input data set, such as a common class prediction. In a binary classification problem, for example, one of two possible class predictions may be shared by hundreds or thousands of input records, and in a multi-class prediction, each class may also be predicted for numerous records of a large data set. According to some embodiments, a determination may be made at the MLS 101 (e.g., at the model result explanation subsystem 150) that an explanatory data set for a common prediction with respect to a plurality of data records is to be provided. The prediction for a given record may be based at least in part on analysis (e.g., using NLP algorithms) of at least a first text attribute of the record, which may contain multiple text tokens, and the explanation may be provided at one or more token group granularities (which may be specified by the MLS client on whose behalf the explanatory data set is to be generated). From the first text attribute of individual ones of the plurality of data records, a respective collection of semantically or grammatically related token groups (e.g., phrases or clauses) may be identified in various embodiments. In some embodiments, the collection of token groups may be obtained by constructing a constituency tree or some other parse tree and then pruning the tree in a bottom-up traversal by merging adjacent pairs of nodes according to a set of heuristics until token groups that remain satisfy pre-determined criteria (e.g., such that each remaining token group's grammatical type belongs to a set of acceptable grammatical token group types such as noun phrases or verb phrases). To individual ones of the token groups identified from a given record, a respective record-level prediction influence score (RPIS) may be assigned in some embodiments. Then, a global or aggregate prediction influence score (APIS) may be determined for each token group from the one or more RPISs generated for that token group (multiple RPISs may be generated if the token group occurs in several records). An explanatory data set for the common prediction, based at least in part on the APISs computed for one or more of the token groups, may be generated and presented via programmatic interfaces 177. Visualizations of the kind indicated above (e.g., in-place highlighting, heat maps, word/phrase clouds, etc.) may be used to present the explanatory data set in some embodiments. MLS clients may specify various parameters pertaining to global explanations, such as the model and common prediction for which an explanation is to be generated, the fraction of most influential token groups to be included, and so on.

In embodiments in which the tree pruning approach is utilized to identify related token groups, a variety of heuristics may be used for the pruning. In one such embodiment, in addition to merging nodes of the tree, starting from leaf nodes corresponding to individual tokens, until the remaining (merged) leaf nodes have a token group type belonging to the set [noun phrases, verb phrases], the lengths (i.e., token counts) of the remaining nodes may also be considered. If after the initial pruning stage terminates with only noun phrases and verb phrases left, a noun phrase contains only a single word or less than N words, for example, that noun phrase may be merged into the subsequent phrase (if a subsequent phrase is available in the pruned version of the tree). In one embodiment, the heuristics may include exceptions to the overall token group type based merging criterion: for example, if two token groups happen to be separated by a conjunction (e.g., "and") or a particular punctuation symbol (e.g., a comma or a dash), the two token groups may not be merged in accordance with the exception. In some cases, a given token group such as a phrase P1 may appear multiple times within a single record R1. In such a case, prior to performing the aggregation of the prediction influence scores across multiple records, a local aggregation step may be performed for P1 in some embodiments, in which respective prediction influence scores of the multiple occurrences of P1 may be combined to generate a record-level prediction influence score of P1 for R1. In various embodiments, the MLS may utilize SHAP-based algorithms to generate the token group RPISs. Access to software containers which can perform the global or aggregated explanation analysis may be provided to MLS clients in various embodiments.

In at least one embodiment, as indicated above, a client may wish to monitor the behavior of a deployed machine learning model (i.e., during executions of the model after it has been trained), e.g., to ensure that the live behavior of the model is not deviating substantially from the behavior expected based on earlier analysis of the model prior to deployment. The imbalance/bias analysis subsystem 160 may be used together with the model result explanation subsystem 150 by a post-deployment model result monitoring coordinator 148 to satisfy such client requirements in the depicted embodiment. A set of metrics, referred to as tracking metrics, associated with the predictions generated by a machine learning model for input data records may be identified for monitoring. The tracking metrics may include or be based on analysis of, for example, explanatory metrics such as prediction influence scores, or on imbalance/bias metrics. Individual ones of the input data records may include at least a first text attribute, and a prediction generated by the machine learning model may be based at least in part on a natural language processing analysis of the first text attribute. At least one tracking metric of the set of tracking metrics may computed directly or indirectly from the first text attribute using a token group granularity specified by a client of the MLS via a programmatic interface, such as token-level granularity, phrase-level granularity, sentence-level granularity and/or paragraph-level granularity in some embodiments.

A group of post-training predictions generated by the model during a time window may be collected. An analysis of the post-training predictions may be conducted to obtain a metric of deviation, during the time window, of the model from a baseline or reference profile of the model obtained earlier with respect to the tracking metrics. For example, with respect to a tracking metric based on the top 10 most influential phrases identified using a reference data set used for generating the baseline profile, a deviation may be computed if (a) the top 10 most influential phrases identified during from predictions within the time window differ from the baseline profile's top 10 phrases (b) the relative rankings among the 10 most influential phrases has changed between the baseline profile and the time window and/or (c) the value of at least one prediction influence score of the top 10 phrases has changed by a substantial margin between the baseline profile and the time window. If the metric of deviation satisfies a reportability threshold or criterion, an indication (e.g., an alarm or a report) that the criterion has been satisfied may be presented via the programmatic interfaces 177 in various embodiments. In at least one embodiment, the MLS may also provide a recommended action which can be taken to attempt to reduce the deviation. For example, an action to enhance or enlarge the training data set and re-train the model may be recommended, or an action to modify some other operation of the machine learning model training and deployment pipeline may be recommended. In some embodiments, the MLS may initiate or perform the recommended action if it is approved by the client. In one embodiment, the client may grant permission in advance to the MLS to enable the MLS to initiate one or more types of recommended actions that have been identified, so such an action may be implemented automatically by the MLS without further guidance from the client.

The MLS client may specify various monitoring related parameters in different embodiments, such as the model whose results or behavior are to be monitored, the tracking metrics to be computed, the lengths of the time windows for monitoring the model, the deviation metric, the reportability criterion for the deviation metric, the token grouping granularity used for the baseline profile and the post-deployment monitoring, and so on. Depending on the kinds of tracking metrics which are to be obtained, a variety of algorithms such as a bootstrap confidence interval generation algorithm or a normalized discounted cumulative gain algorithm may be used to determine the metric of deviation in various embodiments. The baseline profile for the model may be generated at the MLS, e.g., as part of a pre-deployment task of a machine learning pipeline in some embodiments. Access to a software container may be provided to an MLS client for monitoring the model's execution and generating and reporting the deviation metric in at least some embodiments.

A provider network 191 (sometimes referred to as a "cloud provider network" or simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include, in addition to a machine learning service (MLS) 101 and other services shown in FIG. 1, data processing service(s) (e.g., map reduce, data flow, and/or other large scale data processing techniques), network function virtualization services or packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, or a cloud compute service). This service may offer compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. Note that a customer of one service of the provider network may be another service of the provider network—for example, the MLS may use compute instances from the VCS for several of its functions. Each service of the provider network 191 may implement a set of programmatic interfaces, which can be utilized by its (external or internal) clients or customers to request tasks and receive response.

The SCMS 110 shown in FIG. 1 may provide access to software containers that can be utilized by the MLS and by MLS clients. A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Figure 2:
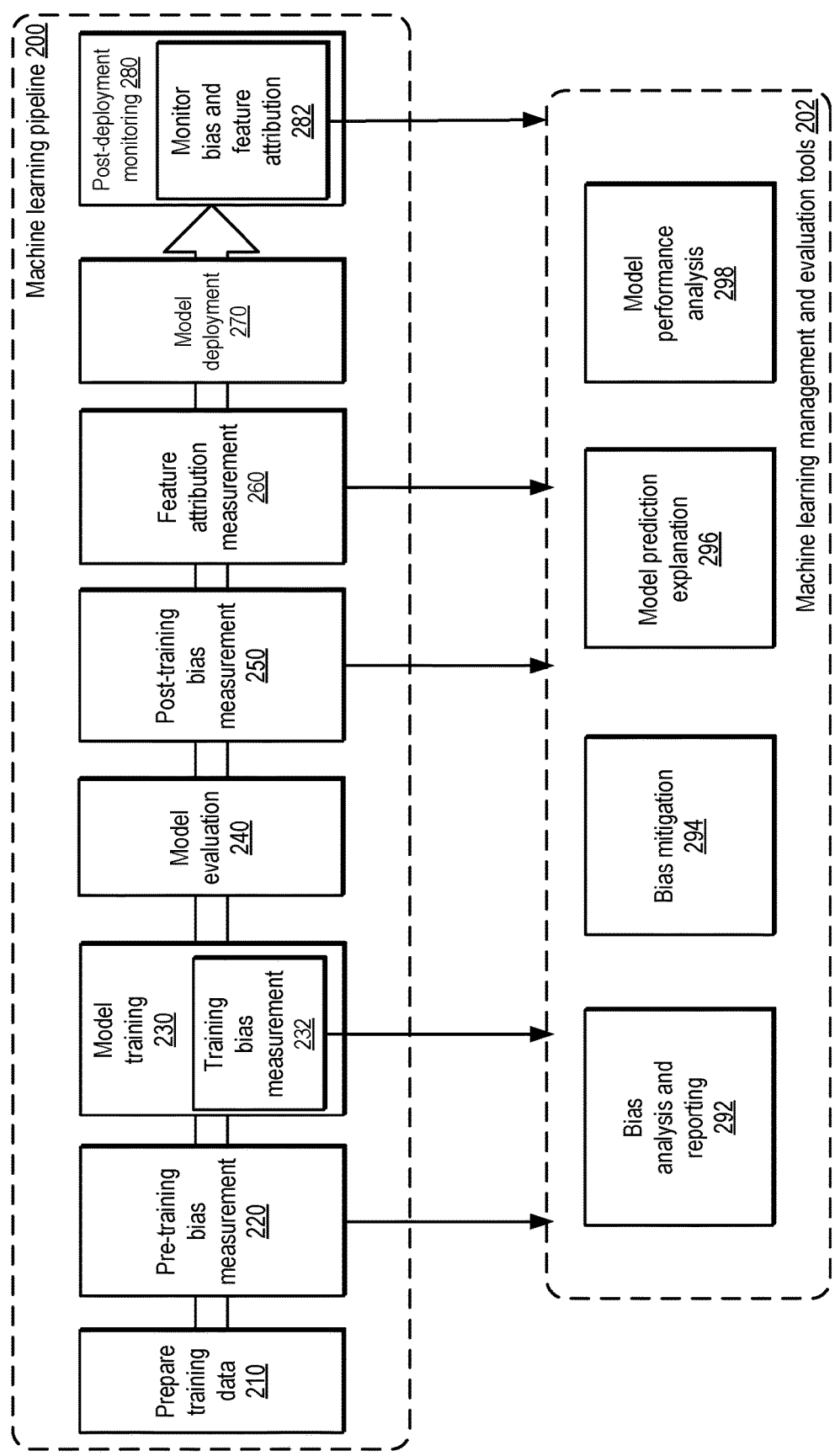
FIG. 2 illustrates an example of a machine learning pipeline which may be implemented with the help of a network-accessible service of a provider network, according to at least some embodiments.

FIG. 2 illustrates an example of a machine learning pipeline which may be implemented with the help of a network-accessible service of a provider network, according to at least some embodiments. Machine learning pipeline 200 may include various stages for the training, evaluation/testing and deployment of a machine learning model (e.g., as part of various systems, services, or applications). Machine learning pipeline 200 may be offered or implemented as part of machine learning systems or services, such as MLS 101 discussed above with regard to FIG. 1.

As mentioned earlier, biases or imbalances may be detected at various stages of a model's lifecycle at an MLS in some embodiments. The example notation discussed in the remainder of this paragraph may be used to define various imbalance related metrics discussed below. In various embodiments in which imbalance or bias is measured with respect to a data set for which labels are available, it may be measured from a comparison of the original labels (e.g., y=0 or 1 in the case of a binary classifier) of a data sample with the predicted labels (y'=0 or 1) for that data sample. Assume that type 1 is the accepted case and type 0 is the rejected case (for example, in a loan application use case). In a training data set, the number of labels of types 0 and 1 may be counted, grouped by the restricted feature (denoted class Xr, e.g., gender, also denoted as the demographic group or attribute of interest, which may be referred to as a "facet" in some embodiments). The subscript "a" (for "advantaged") may be used to indicate the data set records favored by the bias, and the subscript "d" (for "disadvantaged") may be used to indicate the data set records disfavored by the bias. The number of true labels of type 0, 1 may be denoted as n(0), n(1), respectively, with the number of labels of each class being denoted as $n_a$, $n_d$. These counts ($n_a$ and $n_d$) may comprise counts of labels of the advantaged and disadvantaged class, e.g., $n_a(0)$, $n_a(1)$ and $n_d(0)$, $n_d(1)$, respectively. It also may be that $n_a(0)+n_a(1)=n_a$ and $n_d(0)+n_d(1)=n_d$. Corresponding to this notation for true labels, a parallel notation may be used for predicted labels y', with counts n'(0), n'(1) etc.

In various embodiments, pipeline 200 may include a prepare training data stage 210. Prepare training data stage 210 may include various pre-processing operations (e.g., data type conversions, field re-orderings, combining or separating values, anonymizing or other privacy protection techniques, etc.) to ready training data for use to train a machine learning model. Training on biased data prepared, for instance, at prepare training data stage 210, may exacerbate any pre-existing bias in that data. To identify bias in the data before expending time or resources on training, a number of techniques to estimate bias metrics may be implemented. For example, a survey to determine the "golden truth" may be made and compared to the prepared training data set (or a raw data set that has not gone through prepare training data stage 210) to make sure the data is not too contaminated with bias to be useful. The golden truth may represent, in various embodiments, the joint statistical distribution of model inputs that could be used to train any model fairly. These distributions may not always available, so pre-training bias metrics may provide measures for comparison to a golden truth, were it to be available. If the golden truth is not available, such information would allow for an evaluation to assess whether the pre-training bias metrics are in violation of a judgment threshold level in some embodiments.

Pre-training bias measurement 220 may be implemented before machine learning model training stage 230, in various embodiments, to provide various bias measurement techniques for prepared training data. In some embodiments, multiple different pre-training bias measurement techniques implemented as part of pre-training bias measurement 220 may be machine learning model independent. Such pre-training bias measurement techniques may include, for example, class imbalance measurements, difference in positive proportions in true labels, Kullback-Leibler or KL Divergence (KL), Jensen-Shannon divergence (JS), Lp-Norm (LP), total variation distance (TVD), Kolmogorov-Smirnov two-sample approximated version (KS), conditional demographic disparity in labels (CDDL), and the like.

Class imbalance measurements: Bias is often generated from an under-representation of the disadvantaged class in the data set, especially if the desired "golden truth" is equality across classes. As an example, algorithms for granting small business loans may in some cases be biased against women because the historical record of loan approvals contains very few women, which may be the case because women did not usually apply for loans to start small businesses. This imbalance may carry over into model predictions. If $n_a$ is the number of members of the advantaged class and $n_d$ the number for the disadvantaged class, the class imbalance measure may be represented as $$\frac{n_a - n_d}{n_a + n_d}.$$

In various embodiments, a range for this metric may be (−1,1).

Difference in positive proportions in true labels (DPL): This metric compares the proportion of positive outcomes for the disadvantaged class versus that of the advantaged class. For example, are men (class a) and women (class d) given college admission in proportion to how many applicants there are of each gender? Let the proportion of men who get admission be equal to $q_a=n_a^{(1)}/n_a$, where $n_a^{(1)}$ is the number of men who gain admission (as opposed to those who do not get admission, $n_a^{(0)}$). Likewise, the proportion of women who are granted admission is $q_d=n_d^{(1)}/n_d$. A bias metric may be computed as DPL=$q_a-q_d$. If DPL is close to 0, then it can be that "demographic parity" has been achieved ex-post (e.g., already in the historical record). While class imbalance may examine lopsidedness in the numbers of a class a versus d, demographic parity may be concerned with the imbalance in label distributions between classes. This metric may be in a range (−1,1).

KL Divergence (KL): A bias metric may compare the probability distribution of labels of the advantaged class ($P_a$) with that of the disadvantaged class ($P_d$), using KL divergence. KL may measure how much the label distribution of each class differs. This measure generalizes easily to multiple label types, not just binary ones. For example, take college admissions, where an applicant may be assigned by a model to three categories: x={ rejected, wait-listed, or accepted}. How different the distribution $P_a$ is from $P_d$ may be computed. KL may be a measure of entropy. For all three categories, denoted by x, the ratio log $[P_a(x)/P_d(x)]$ may be computed, which is a measure of distance between the probability distributions for a label x. The probability weighted sum of this measure may then be taken, weighted by the probability of $P_a(x)$, which gives the KL measure of divergence of class a from class d. The measure is also a label imbalance metric and is denoted as $$KL(P_a\|P_d) = \sum_x P_a(x)\log\left(\frac{P_a(x)}{P_d(x)}\right).$$

This metric may be non-negative, KL>=0. $P_d(x)$>0 for all x.

Jensen-Shannon divergence (JS): Denoting the average label distribution across the classes as P, the JS divergence may be computed as the average of the KL divergence of the probability distribution of the advantaged class vs. P and the KL divergence of the probability distribution of the disadvantaged class vs. P. This is an extension of the KL label imbalance measure. A reason for performing this computation is that it works around the fact that KL is not symmetric. The measure may be computed as $$JS(P_a, P_d, P) = \frac{1}{2}[KL(P_a, P) + KL(P_d, P)].$$

This metric may be non-negative, JS>=0. It may provide a symmetric difference between label distributions $P_a$ and $P_d$.

Lp-Norm (LP): Another measure of distance in label distributions is the normed direct distance between the distributions. For every label category, e.g., x={rejected, wait-listed, accepted} in college admissions, the difference may be taken and take the p-polynomial mean. The measure is computed as $L_p(P_a,P_d)=[\Sigma_x|P_a(x)-P_d(x)|^p]$. This metric may be non-negative, LP>=0.

Total variation distance (TVD): this is half the Hamming (L_1) distance between the probability distribution of labels of the advantaged class and the probability distribution of labels of the disadvantaged class $$TVD = \frac{1}{2}L_1(P_a, P_d) \geq 0.$$

This metric may be non-negative, TVD>=0.

Kolmogorov-Smirnov (KS), two-sample approximated version: This metric evaluates the KS statistical test between the probability distribution of labels of the advantaged class and the probability distribution of labels of the disadvantaged class. It indicates whether there is a big divergence in one of the labels across classes. It complements the other measures by zoning in on the most imbalanced label and may be represented as KS=max ($|P_a(x)=P_d(x)|$). This metric may be in the range (0,1).

Conditional demographic disparity in labels (CDDL): This metric examines disparity of outcomes (labels) between two classes, advantaged and disadvantaged, but it also examines this disparity in subgroups, by stratifying the data using a "group" variable. It determines whether the disadvantaged class has a bigger proportion of the rejected outcomes than the proportion of accepted outcomes for the same class. For example, in the case of college admissions, if women applicants comprised 60% of the rejected applicants and comprised only 50% of the accepted applicants, then it may be that there is demographic disparity (DD) because the rate at which women were rejected is greater than the rate at which they are accepted. Demographic disparity (DD) may be described as the difference between the proportion of rejected outcomes and the proportion of accepted outcomes for a given class. For simplicity, assume that all the applicants can be grouped as either men or women. Suppose men comprised 40% of the rejected applicants and 40% of the accepted applicants, and hence, women comprised 60% of the rejected applicants and 60% of the accepted applicants. In this case, there is no demographic disparity, but by the other metric DPL above, there is no demographic parity. Conditional Demographic Disparity (CDDL) may be the weighted average of demographic disparity (DD) over different classes, with each class weighted by its size, represented as $$CDD = \frac{1}{n}\sum_i n_i \cdot DD_i, \sum_i n_i = n.$$

Both DD and CDDL may be in the range (−1, +1).

Machine learning training stage 230 may take the prepared training data (which may have been approved based on pre-training bias measurement 220), and perform various machine learning techniques to train a machine learning model in the embodiment shown in FIG. 2. Various different types of machine learning algorithms and techniques may be implemented (e.g., neural networks, support vector machines, linear regression, decision trees, naïve Bayes, nearest neighbor, q-learning, temporal difference, deep adversarial networks, among others) in the depicted embodiment. As part of machine learning training, additional bias measurements 232 may be obtained and stored. Model evaluation stage 240 may be where automated or manual techniques (e.g., performed by engineers or data scientists) consider the performance of the machine learning model training stage 230 and the resulting trained model. Changes to the machine learning model and training techniques may be made based on evaluation results, in some embodiments.

Post-training bias measurement 250 may be implemented as part of machine learning pipeline 200 to capture various bias measurements after a machine learning model is trained in the depicted embodiment. After training a machine learning model, additional information may be obtained from the model itself. For example, the predicted probabilities from the model (p') and the predicted labels (y') may be determines. These may allow an additional set of bias metrics to be calculated relative to those computed earlier in the pipeline. Any bias that arises post-training may emanate from biases in the data and/or biases in the model's internal prediction logic. Post-training bias metrics may include, among others, difference in positive proportions in predicted labels (DPPL), disparate (adverse) impact (DI), difference in conditional outcome (DCO), recall difference (RD), difference in label rates (DLR), precision difference (PD), accuracy difference (AD), treatment equality (TE), conditional demographic disparity in predicted labels (CDDPL) and counterfactual fliptest (FT).

Difference in positive proportions in predicted labels (DPPL): This is described as the difference in the proportion of positive predictions (y'=1) for the advantaged class versus the proportion of positive predictions (y'=1) for the disadvantaged class. For example, if the model grants loans to 50% of women and to 60% of men, then it may be biased against women. It may have to be decided whether a 10% difference is material. A similar bias would be detected in hiring situations, college admissions, etc. The measure would be $$\hat{q}_a = \frac{\hat{n}_a^{(1)}}{n_a}, \hat{q}_d = \frac{\hat{n}_d^{(1)}}{n_d}, \hat{q}_a - \hat{q}_d.$$

This metric may be in a range of (−1,1). The carat may denote model predicted or estimated label numbers.

Disparate (Adverse) impact (DI): This metric may be assessed in the form of a ratio $$DI = \frac{\hat{q}_d}{\hat{q}_a}.$$

This metric may take the values DI>=0.

Difference in conditional outcome (DCO): This metric compares the actual labels to the predicted labels from the model and assesses whether this is the same across classes. For instance, were there more than predicted loans given to one class and less to others? Example: of 100 men and 50 women, the model recommended that 60 men and 30 women be given loans, so the predicted proportions are fair, but the data set shows that 70 men and 20 women were given a loan instead, suggesting bias, measured by a comparison of predicted labels vs true labels. Clearly here, the lender is giving more loans to men than assessed by the model and fewer loans to women than prescribed by the model. The DCO metric captures this sort of bias. This metric accounts for whether one group is deserving or not and then measures bias. DCO may be broken down into two types, difference in conditional acceptance (DCA) and difference in conditional rejection (DCR). DCA is computed as $$c_a = \frac{n_a^{(1)}}{\hat{n}_a^{(1)}} \; c_d = \frac{n_d^{(1)}}{\hat{n}_D^{(1)}}, DCA = c_a - c_d.$$

DCA may be unbounded. DCR is for rejection rates, computed as $$r_a = \frac{n_a^{(0)}}{\hat{n}_a^{(0)}} \; c_d = \frac{n_d^{(0)}}{\hat{n}_D^{(0)}}, DCR = r_d - r_a.$$

DCR may also be unbounded.

Recall difference (RD): This metric may be used for determining whether there is a difference in recall of the model across the attributes of interest. A recall bias metric may indicate how often the model correctly captures the cases that should receive a positive outcome. For example, of all the people who should be given loans, how many are detected correctly by the model? Recall may be perfect for a class if all y=1 cases are correctly called as y'=1 for that class. If recall is high for lending to non-minorities but low for lending to minorities, then the difference may be a measure of bias against minorities (the minority class may be defined in many ways, such as by gender, age, etc., for example with race, there may be some races categorized as minorities, such as African Americans, Hispanics, and Native Americans). Here, higher recall for the advantaged class suggests that the machine learning model predicts fewer false negatives for the advantaged class than for the disadvantaged class, (e.g., it finds more of the actual true positives for the advantaged class than the disadvantaged class), which is a form of bias. RD may be the difference in recall for the advantaged vs. disadvantaged group, described as $$RD = \frac{TP_a}{TP_a + FN_a} - \frac{TP_d}{TP_d + FN_d}.$$

Recall may be greater when the machine learning model minimizes false negatives. RD may be in a range of (−1,+1).

Difference in label rates (DLR): labels may be positive or negative outcomes. The difference in the rates of these positive and negative predicted outcomes across the advantaged and disadvantaged classes is a measure of bias. Two types of bias metrics for this difference may include difference in acceptance rates (DAR) and difference in rejection rates (DRR). DAR measures whether qualified applicants from the advantaged and disadvantaged classes are accepted at the same rates. It is the difference in the ratio of true positives to predicted positives for each class. DRR measures whether qualified applicants from the advantaged and disadvantaged class are rejected at the same rates. It is the difference in the ratio of true negatives to predicted negatives for each class. These two metrics may be computed as $$DAR = \frac{TP_a}{\hat{n}_a^{(1)}} - \frac{TP_d}{\hat{n}_d^{(1)}} \; DRR = \frac{TN_d}{\hat{n}_d^{(0)}} - \frac{TN_a}{\hat{n}_a^{(0)}}.$$

These metrics may be in a range of (−1,+1).

Precision difference (PD). If the precision for the advantaged class is greater than the precision for the disadvantaged class, it implies that more of the predicted true positives are valid compared to false positives for the advantaged class. This suggests that predictions favor the advantaged class. PD may be the difference in precision for the advantaged vs. disadvantaged classes. Precision difference is the same as DAR. PD may be a measure of Type I error and the higher the precision, the lower the number of false positives. Precision difference may be in the range (−1,+1).

Accuracy difference (AD). Classification by the ML model may be more accurate for one class than the other. This is a useful metric because it indicates that one class incurs a greater proportion of Type I and Type II errors. For example, if loan approvals are made with much higher accuracy for men than for women, it means that a greater proportion of qualified women are denied a loan and greater proportion of unqualified women get a loan too. This leads to within group unfairness for women even if the proportion of loans granted is nearly the same for both men and women (DPPL close to 0). AD may be computed as $$AD = \frac{TP_a + TN_a}{TP_a + TN_a + FP_a + FN_a} - \frac{TP_d + TN_d}{TP_d + TN_d + FP_d + FN_d}.$$

This metric may be in the range (−1,+1).

Treatment equality (TE): This may represent the difference in the ratio of false positives to false negatives for the advantaged vs. disadvantaged classes. Even if the accuracy across classes is the same, is it the case that errors are more harmful to one class than another? TE measures whether errors are compensating in the same way across classes. Example: 100 men and 50 women apply for a loan. 8 men were wrongly denied a loan and another 6 were wrongly approved. For women, 5 were wrongly denied and 2 were wrongly approved. The ratio of false positives to false negatives equals 0.75 for men and 0.40 for women, and hence TE=0.75−0.40=0.35, even though both classes have the same accuracy of 0.86. TE may be computed as $$\frac{FP_a}{FN_a} - \frac{FP_d}{FN_d}.$$

Conditional demographic disparity in predicted labels (CDDPL): A comparison of difference in predicted rejection proportion and predicted acceptance proportion across classes. This metric is similar to the corresponding pre-training metric CDDL except that it is computed off the predicted labels instead of the actual ones. This metric lies in the range (−1,+1).

Counterfactual fliptest (FT): The fliptest is an approach that looks at each member of the disadvantaged class and assesses whether similar members of the advantaged class have different model predictions. The members of the advantaged class are chosen to be k-nearest neighbors of the observation from the disadvantaged class. It may be determined how many nearest neighbors of the opposite class receive a different prediction, where the flipped prediction can go from positive to negative and vice versa. There are two versions of this metric:

$$FT_1 = \frac{|F^+(h, G)| + |F^-(h, G)|}{n_d}$$

and $$FT_2 = \frac{|F^+(h, G)| + |F^-(h, G)|}{n_d}.$$

Feature attribution measurements 260 (also referred to as prediction influence metrics) may be obtained as part of machine learning pipeline 200 in the depicted embodiment. In various embodiments, feature attribution may be determined using Shapley values. Feature attribution measurements can be provided at an instance level, for a specific prediction made by a machine learning model, for a group of common predictions, and at a global level for the machine learning model as a whole. For example, in some embodiments, the feature attributions may be the Shapley values in a game (e.g., from game theory) where the total payoff is the model prediction with all the features included, and the players are the individual features. Taking the example of a college admission scenario, consider a model with features {SAT Score, GPA, Class Rank}, where it is desirable to explain the model prediction for a candidate. The range of model prediction is 0-1. The prediction for a candidate is 0.95. Then in the game, the total payoff would be 0.95 and the players would be the three individual features. If for the candidate, the Shapley values are {0.65, 0.7, −0.4}, then it may be determined that the GPA affects the prediction the most, followed by the SAT score. It may also be determined that while GPA and SAT score affect the prediction positively, the class rank affects it negatively (note that a lower rank is better).

A baseline profile of behavior of a machine learning model (with respect to both prediction influence metrics, as well as bias metrics of the kind discussed above) may be generated in various embodiments using a reference data set, and then later the post-deployment behavior of the model may be compared to the baseline profile. One possible class of attribution algorithms includes several algorithms based on computation of Shapley values (or approximations of Shapley values). During the computation of Shapley values for feature attribution with respect to a new data set, in some embodiments, the absence of a feature may be modeled by setting the feature value to that of the reference data set and the presence of a feature is modeled by setting the feature value to that of the new data set. Thus, the absence of all features corresponds to the reference data set and the presence of all features corresponds to the given instance. It may sometimes be desirable to select a reference data set with very low information content. For example, an average instance can be constructed from the training data set by taking either the median or average for numerical features and the mode for categorical features. For the college admissions example, this could be used to explain why a particular applicant was accepted as compared to a reference data set consisting of an average applicant.

Alternatively, explanations can be generated with respect to informative reference data sets in some embodiments. For the college admissions scenario, it might be likely to explain why a particular applicant was rejected when compared with other applicants from similar demographic backgrounds. In this case, a reference data set can be chosen that represents the applicants of interest, namely those from a similar demographic background. Thus, informative reference data sets can be used to concentrate analysis on the specific aspects of a particular model prediction. They can isolate the actionable features for assessment by setting demographic attributes and other non-actionable features to the same value as in the given instance. Reference data sets may be specified as part of a training request in some embodiments, and/or via other programmatic input provided by an MLS client.

In various embodiments, computing the full set of Shapley values involves considering all possible coalitions of features. This means that given d features, there are $2^d$ such possible feature coalitions, each corresponding to a potential model that needs to be trained and evaluated. Even for reasonable values of d, say 50 features, it may be computationally prohibitive and impractical to train $2^d$ possible models, and hence various approximation techniques may be used, in some embodiments. For example, SHAP (SHapley Additive exPlanations), may be used, which incorporates such approximations. In various embodiments, a scalable and efficient implementation of the Kernel SHAP algorithm through additional optimizations may be implemented.

Global explanations of machine learning models may be provided, in some embodiments, according to feature attribution measurements 260. For example, global explanation of an ML model may be obtained by aggregating the Shapley values over multiple instances of data (e.g., multiple attributes, or multiple text token groups). Different ways of aggregation may be implemented, in various embodiments, such as the mean of absolute SHAP values for all instances, the median of SHAP values for all instances, and mean of squared SHAP values for all instances.

Prediction influence detection techniques such as SHAP techniques may be applied to text attributes at various levels of granularity in different embodiments. For example, for computing per-individual-token attribution or prediction influence using SHAP, in some embodiments, a formula similar to the following formula F1 may be used. SHAP, which is a model-agnostic method and thus can be applied to results of different models regardless of the type of learning algorithm used by the model, estimates the importance or influence of a given token by simulating its absence from different subsets of tokens, called coalitions, and computing the average marginal gain of adding the token being considered back into the coalitions.

$$\Phi = \arg \min \sum_{c \subseteq t} \left[ f_c(c) - \left( \phi_0 + \sum_{w \in c} \phi(w) \right) \right]^2 \times k_{SHAP}(t, c) \quad \text{Formula F1}$$

In F1, $\Phi$ represents the prediction influence score, c is a sub-part of the input t corresponding to the tokens that are not dropped, $k_{SHAP}(t,c)$ represents the SHAP kernel, $\phi_0$ refers to the model output on a baseline input, $\phi_{(w)}$ refers to the model output for an input including token w, and fc refers to the model output on the remaining (non-dropped) tokens. Token dropping may be simulated by replacing a token with an "unknown vocabulary" token in some embodiments. The exact computation for per-token prediction influence scores using F1 may require solving F1 overall $2^T$ subsets of tokens in a text attribute with T tokens. Since this exact computation may become infeasible for even modestly large numbers of tokens, in practice, a much smaller number of coalitions may be employed in various embodiments. In some embodiments, a method called Integrated Gradients may be used to estimate per-token attribution. Integrated Gradients, unlike SHAP, is not model-agnostic, in that it requires access to model gradients.

Techniques such as SHAP, Integrated Gradients and Layer-wise Relevance Propagation (LRP) have the desirable property that the sum of the individual token attributions equals the predicted attribution score of the entire input text considered. To compute attribution or prediction scores for groups of multiple adjacent tokens, meta-tokens may be formed from the multiple tokens and the attributions of each of the tokens of the meta-tokens may be summed in some embodiments using any of these techniques (or other similar techniques that have the same desirable property). This method may be referred to as the indirect method for computing attribution scores. For SHAP, however, an alternative, referred to as the direct method, may be used in some embodiments. Instead of first determining individual token-level scores, and then summing them for the token groups (sentences, phrases etc.) of interest, the equation F1 may be solved by forming coalitions via dropping full meta-tokens instead of dropping individual tokens. This direct method may reduce the number of possible coalitions dramatically in at least some embodiments, and hence may lead to more accurate estimations of predictive influence for token groups for the same computation budget.

As indicated in element 270, a trained machine learning model may be deployed and placed into service for applications (e.g., in production environments) in various embodiments. For example, an application may implement the model as part of various business or other application logic, or use it to provide feedback to an interface for a user. Trained models may be hosted or used in provider network environments, including being hosted as part of an MLS. In at least some embodiments, respective models or groups of models may be run within respective software containers to which an MLS provides access to MLS clients, and feature attribution and bias analysis, as well as post deployment monitoring may be performed using such containers.

After deployment, post-deployment monitoring 280 may be implemented in the depicted embodiment. Bias measurements and feature attribution measurements, as indicated in element 282, may be obtained as part of performance monitoring. For example, measuring bias only during the train-and-deploy phase may not detect all scenarios where bias can exist. It is quite possible that after the model has been deployed, the distribution of the data that the deployed model sees, that is, the live data, is different from that of the training data set. This change may cause the model to exhibit more bias than it did on the training data, and the attribution metrics for different elements of input data records may also change. The change in the live data distribution might be temporary (e.g., due to some short-lived behavior like the holiday season) or permanent. In either case, it might be important to detect these changes. To detect these changes, a selected set of metrics (referred to as tracking metrics or target metrics) which may include (or be derived from) bias metrics as well as attribution metrics of a deployed model may be performed on an ongoing basis, as discussed in further detail below. Allowed range of values may be specified for various tracking metrics, such that any deviation from this range should raise a "reportable deviation detected" alert. In various embodiments, monitoring jobs can be specified that perform these checks at regular intervals or time windows. For instance, the frequency of the checks can be specified to be two days. This means that every two days, monitoring may determine the values of tracked metrics on the data that the model processed during the previous two-day time window, and alarms should be raised if the deviation metrics lies outside the acceptable range. To ensure that the conclusions drawn from the observed post-deployment model results are statistically significant, confidence intervals may be computed in some embodiments, e.g., using a bootstrap confidence interval generation algorithm.

In various embodiments, a drift in attribution can be detected by comparing how the ranking of the individual features (including text token groups at various granularities) changed from reference data (e.g., part or all of the training data) to live data. In addition to being sensitive to changes in ranking order only, raw attribution score of the features may be instructive. For instance, given two features that fall in the ranking by same number of positions going from reference to live data, it may be valuable to be more sensitive to the feature that had a higher attribution score in the reference data. With these properties in mind, a normalized discounted cumulative gain (NDCG) score for comparing the feature attributions rankings of reference and live data may be computed, in some embodiments.

For example, NDCG may be determined according as follows: $F=[f_1, \ldots, f_m]$ may be the list of features sorted with respect to their attribution scores in the reference data where m is the total number of features and $a(f)$ may be a function that returns the feature attribution score on the training data given a feature f $F'=[f'_1, \ldots, f'_m]$ may be the list of features sorted with respect to their attribution scores in the live data where m is the total number of features. NDCG may then be computed as $$NDCG = \frac{DCG}{iDCG} \text{ with } DCG = \sum_{i=1}^{m} \frac{a(f'_i)}{\log_2(i+1)}$$

and $$iDCG = \sum_{i=1}^{m} \frac{a(f_i)}{\log_2(i+1)}$$

The quantity DCG measures if features with high attribution in the reference data are also ranked higher in the feature attribution computed on the live data. The quantity iDCG measures the "ideal score" and is just a normalizing factor to ensure that the final quantity resides in the range [0, 1], with 1 being the best possible value. An NDCG value of 1 means that the feature attribution ranking in the live data is the same as the one in the reference data. A threshold for monitoring may be specified for comparison with respect to the NDCG value, in some embodiments (e.g., alert if NDCG<0.9).

The bias metrics and feature attribution captured at various stages as part of machine learning pipeline 200 may be integrated into various techniques for analyzing, visualizing and monitoring machine learning data and models. This information may be stored (e.g., at a common backend store, such as a storage service of a provider network), for later use. Various machine learning and evaluation tools 202 may implement or rely upon the stored information to implement tasks such as bias analysis and reporting 292, bias mitigation 294, model explanation 296, and model performance analysis 298, in various embodiments. Various combinations of the bias/imbalance metrics of the kind discussed above, as well as predictive influence or feature attribution scores, may be computed in different embodiments; in some cases, the specific types of bias metrics and/or feature attribution scores to be computed may be indicated via programmatic interfaces by MLS clients. Note that the techniques for attribution and post-deployment monitoring described above may be applied for input data which comprises various types of attributes, including but not limited to numeric attributes, categorical attributes, and text attributes, with text tokens being grouped at various granularities as described above.

Figure 3:
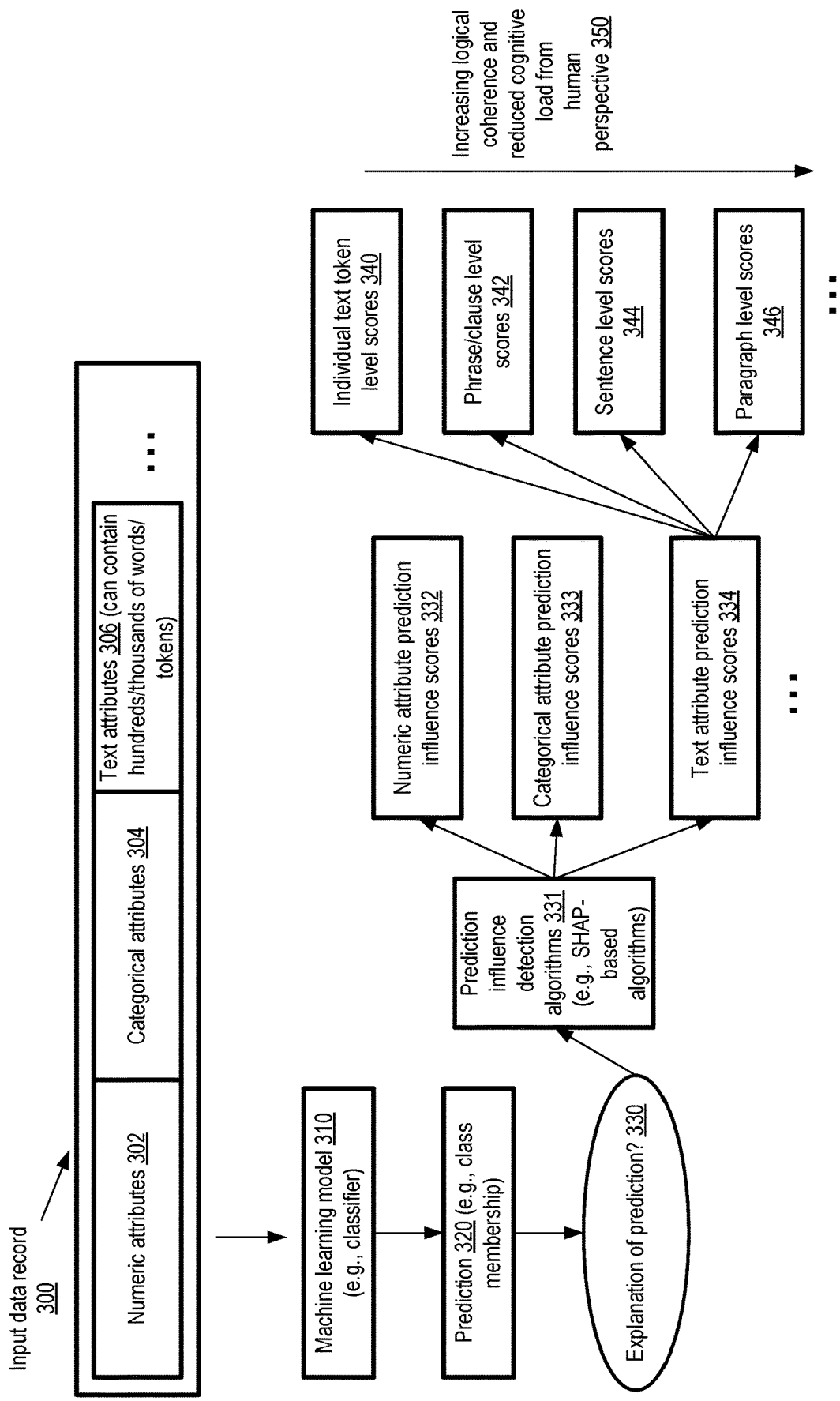
FIG. 3 illustrates examples of text granularities at which prediction influence scores can be generated to help explain machine learning model predictions, according to at least some embodiments.

FIG. 3 illustrates examples of text granularities at which prediction influence scores can be generated to help explain machine learning model predictions, according to at least some embodiments. An input data record 300 consumed by a machine learning model 310 (such as a classifier) may in general comprise attributes of several different types, such as numeric attributes 302, categorical attributes 304, text attributes 306, and so on. A given text attribute 306 may in turn comprise numerous, e.g., hundreds or even thousands of text tokens such as words, punctuation symbols and the like. For example, a text attribute may comprise contents of a multi-page document in some cases. The machine learning model 310 may produce a prediction 320 for the input data record 300 based on the analysis of the attributes, and an explanation of the prediction may be desired as indicated in element 330.

To generate an explanatory data set which can help to explain the prediction, any of a variety of prediction influence detection algorithms 331 (such as the SHAP based algorithms mentioned earlier) may be employed in different embodiments. Respective prediction influence scores 332 and 333 for numeric attributes 302 and categorical attributes 304 may be generated using such algorithms. For text attribute prediction influence scores 334, a decision may have to be made as to whether and how the tokens making up the text attribute should be grouped for the purpose of explaining the prediction. Prediction influence scores 334 may be generated for text attributes at the individual text token level 340, phrase/clause level 342, sentence level 344, and/or paragraph level 346 in some embodiments. As one proceeds from the granularity of individual tokens to sentences, the logical coherence of the explanatory data sets from the perspective of human consumers of the explanations may increase, as indicated by the arrow 350, and cognitive load or effort required to understand the explanations may decrease. Of course, from a technical perspective, it may be simplest to generate individual token level prediction scores. However, as discussed above in the context of FIG. 2, in at least some embodiments baseline token-level attribution techniques such as SHAP, Integrated Gradients or Layer-wise Relevance Propagation may be modified or extended to provide prediction scores for larger token groups such as phrases/clauses, sentences and paragraphs. Such attribution granularities may be more helpful in achieving the objectives of explainable AI than token-level prediction scores, especially in scenarios in which data records may include very large numbers of text tokens.

In order to analyze a text attribute, several types of techniques for parsing and organizing the text tokens may be employed, including techniques referred to as chunking. Some conventional techniques for parsing and chunking may not be very effective at generating token groups of a sufficient size for the kinds of explanations which may be most useful for clients of an MLS such as MLS 101 of FIG. 1. FIG. 4 illustrates examples of token groups which may be generated from a text attribute of a machine learning input data record using conventional chunking algorithms, according to at least some embodiments. The content of an example input text attribute 400 which may be provided to a conventional chunking algorithm 410 is shown in FIG. 4. The text attribute consists of the following 37 words: The strongest rain ever recorded in CountryA shut down the financial hub of CityB, snapped communication lines, closed airports and forced thousands of people to sleep in their offices or walk home during the night, officials said.

The output chunk list 414 generated from the text attribute 400 comprises 26 chunks or token groups in the depicted example. Individual token groups may comprise, for example, noun phrases (NPs) such as "the strongest rain", "CountryA", etc., adverb phrases (ADVPs) such as "ever" or "home", verb phrases (VPs) such as "recorded" or "snapped", prepositional phrases (PPs) such as "in" or "of", and particles (PRTs) such as "down". As is clear from the chunk list 414, the average chunk or token group is quite short in terms of the numbers of tokens included (37/26 or approximately 1.42 tokens per chunk). Such short token groups, typically produced by conventional chunking algorithms, may not be very useful for explaining text-based machine learning model predictions. Accordingly, a more sophisticated method to construct token groups may be employed in some embodiments, involving the construction of a parse tree from a text attribute, followed by pruning the tree using heuristics.

Figure 5:
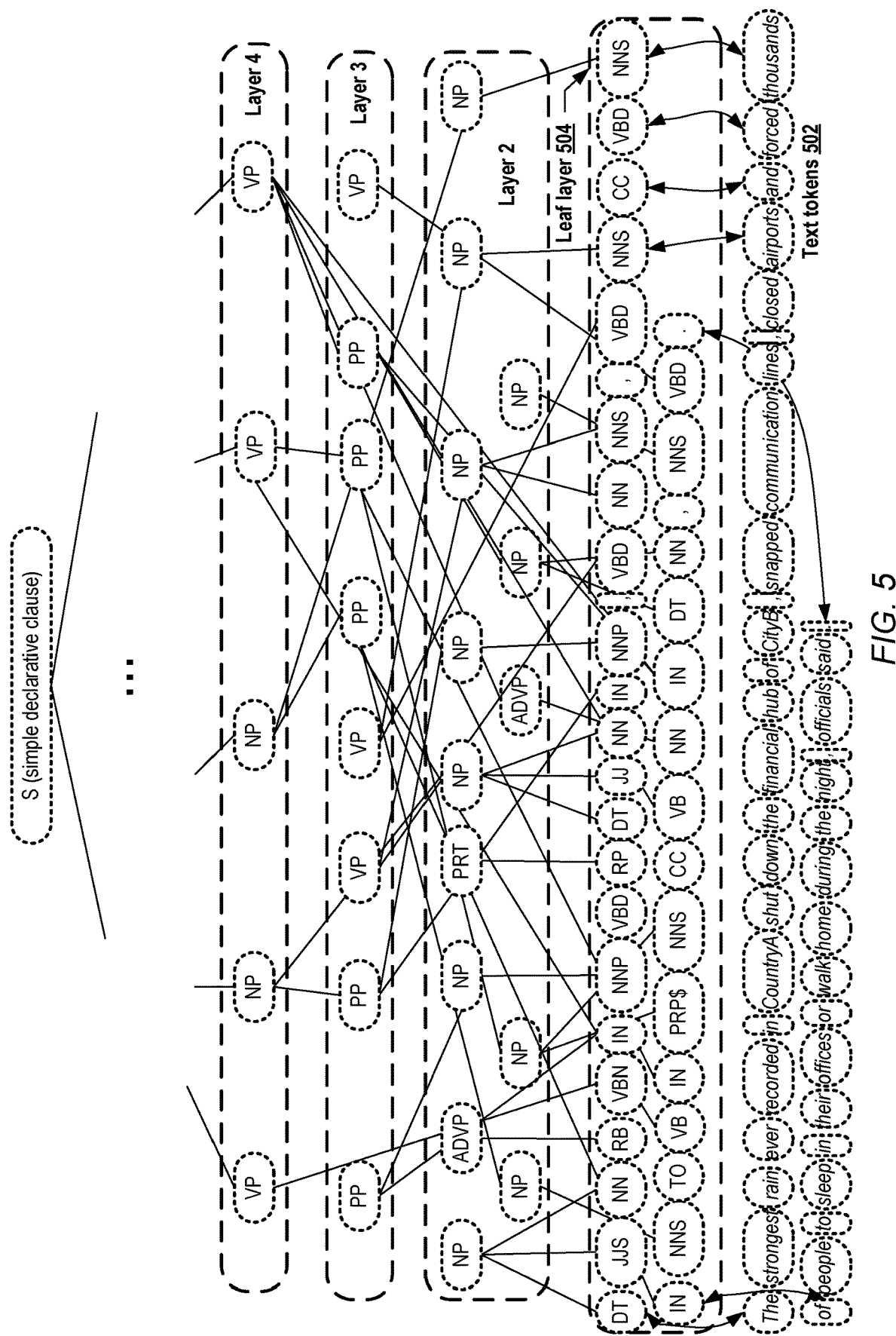
FIG. 5 illustrates an example constituency tree which may be generated from a text attribute of a machine learning input data record, according to at least some embodiments.

Any of several types of parse tree representations may be used in different embodiments to generate logically related token groups which are typically larger than the token groups generated by conventional chunking techniques of the kind shown in FIG. 4. One such tree is referred to as a constituency tree. FIG. 5 illustrates an example constituency tree which may be generated from a text attribute of a machine learning input data record, according to at least some embodiments. Syntactic constituency is the idea that groups of words or tokens typically behave as single units called constituents. Part of the process for developing a grammar that can be used to try to analyze text is building an inventory of constituents in the language used for the text. Such an inventory of constituents may include, for example, noun phrases, verb phrases and the like, some of which were introduced in the chunking discussion above. A widely used formal system for modeling constituent structure is called context-free grammars or CFGs (also called phrase-structure grammars; the CFG formalism is equivalent to the Backus-Naur Form or BNF). A CFG for a given language such as English consists of a set of rules or productions, each which expresses the ways that symbols of the language can be grouped and ordered, and a lexicon of words and symbols. For example, the following productions express that an NP or noun phrase can be composed of either a proper noun or a determiner (Det) followed by a Nominal, and that a Nominal in turn can consist of one or more Nouns.

NP→Det Nominal
NP→ProperNoun
Nominal→Noun|Nominal Noun

CFGs can be hierarchically embedded, so various rules/productions can be combined with others. A CFG can be thought of either as a device for generating sentences, or as a device to assign a structure to a given sentence. Based on the rules or productions of a CFG, a derivation of a string of words can be generated, and represented as a parse tree or a constituency tree.

In the scenario shown in FIG. 5, the text tokens 502 of the example attribute 400 of FIG. 4 are parsed to construct a multi-layer constituency tree. Each token (including punctuation symbols such as commas) is represented by a corresponding node at leaf layer 504 of the tree; for non-punctuation tokens, the node indicates a classification tag for that token. The example classification tags shown in FIG. 5 at various levels of the tree are part of a publicly available collection called the Penn Treebank II Tags; in some embodiments, other sets of classification tags may be used. The tags used in the leaf layer include DT (determiner) (e.g., for the token "the"), JJS (adjective, superlative) (e.g., for the token "strongest"), NN (noun, singular or mass) (e.g., for the token "rain"), RB (adverb) (e.g., for the token "ever"), VBN (verb, past participle) (e.g., for the token "recorded"), IN (preposition or subordinating conjunction) (e.g., for the tokens "in" and "of"), NNP (proper noun, singular) (e.g., for the tokens "CountryA" or CityB"), VBD (verb, past tense) (e.g., for the token "said"), RP (particle)(e.g., for the token "down"), JJ (adjective) (e.g., for the token "financial"), NNS (noun, plural) (e.g., for the token "lines"), CC (coordinating conjunction) (e.g., for the tokens "and" and "or"), TO (for the token "to"), and PRP$ (possessive pronoun) (e.g., for the token "their").

At layers 2, 3 and 4 of the tree, the tokens represented by the tags at layer 1 are combined into semantically related groups such as NPs (noun phrases), VPs (verb phrases), ADVPs (adverb phrases), PPs (prepositional phrases), PRTs (particle phrases), and the like. (Note that the layers 2, 3 and 4 are not strictly hierarchical from layer to layer in that some of the node-to-node links cross layers—e.g., some links from nodes at layer 4 or layer 3 go to nodes at layer 1.) More combinations may be made as the tree is constructed from the leaf layer upwards eventually lead to the root node S, representing a simple declarative clause or sentence. The motivation behind using such tree representations to group tokens into units that might be more useful for explaining model training predictions is that as one traverses from the bottom of the tree towards the top, the meaningfulness and conceptual coherence of the token groupings typically increase, and the average length of the token groups tends to increase. As such, it may make sense to generate token groups from a text attribute using constructs at the higher levels of the parse tree (levels closer to the root node) and then attempt to assign predictive influence scores to such token groups. The generation of such token groups from a full parse tree may be referred to as pruning the tree.

FIG. 6 is a flow diagram illustrating aspects of operations that may be performed to generate prediction influence scores for semantically related token groups by applying a pruning algorithm to a parse tree representation of a text attribute of a machine learning input data record, according to at least some embodiments. As shown in element 601, a parse tree representation such as a constituency tree may be generated from respective sentences of a text attribute of a machine learning data record's text attribute in various embodiments. In some embodiments, a neural network-based transformer model similar to the Berkeley neural parser may be used to generate the trees; in other embodiments, the trees may be generated without using neural networks. Individual leaf nodes of the initial tree may correspond to individual text tokens, while non-leaf nodes at intermediate layers may represent semantically or grammatically related token groups such as phrases or clauses. Tags similar to those shown in FIG. 5 may be used as labels for the tree nodes in at least some implementations.

An analysis of the tree, comprising deterministically pruning the tree by merging various sets of tokens represented by the nodes, may be conducted to identify semantically-related or grammatically-related token groups in various embodiments. A bottom-up traversal of a given tree may be conducted to prune a tree constructed for a given sentence (element 604). Adjacent (and in some cases non-adjacent) nodes may be merged according to a set of heuristics, e.g., until all the leaf nods of the pruned version represent examples of only a small set of target token group types such as noun phrases (NPs) and verb phrases (VPs). The heuristics may also include exceptions in some implementations to the above default merging rule such as "do not merge two adjacent token groups if they are separated by punctuation symbols such as commas or dashes" and "do not merge two adjacent token groups if they are separated by a coordinating conjunction, a subordinating conjunction or a preposition". In addition, in some implementations, the heuristics may require merging token groups (in the pruned version) whose token count is less than a threshold N (e.g., single-token noun phrases) with a subsequent token group. In various embodiments, applying the heuristics may result in a deterministically selected set of semantically related token groups.

A list (or other data structure) of the unique semantically related token groups that remain after the pruning of the tree representation may be generated, e.g., by eliminating duplicate token groups in some embodiments (element 607). Respective prediction influence scores may then be generated for each of the token groups, e.g., using SHAP-based techniques of the kind discussed in the context of FIG. 2 for multiple text tokens (element 610). Similar operations to those of elements 607 and 610 may be performed for each of the sentences of the text attribute in various embodiments, and the prediction influence scores may then be used to generate and present explanatory data sets for the predictions of the machine learning models.

Figure 7:
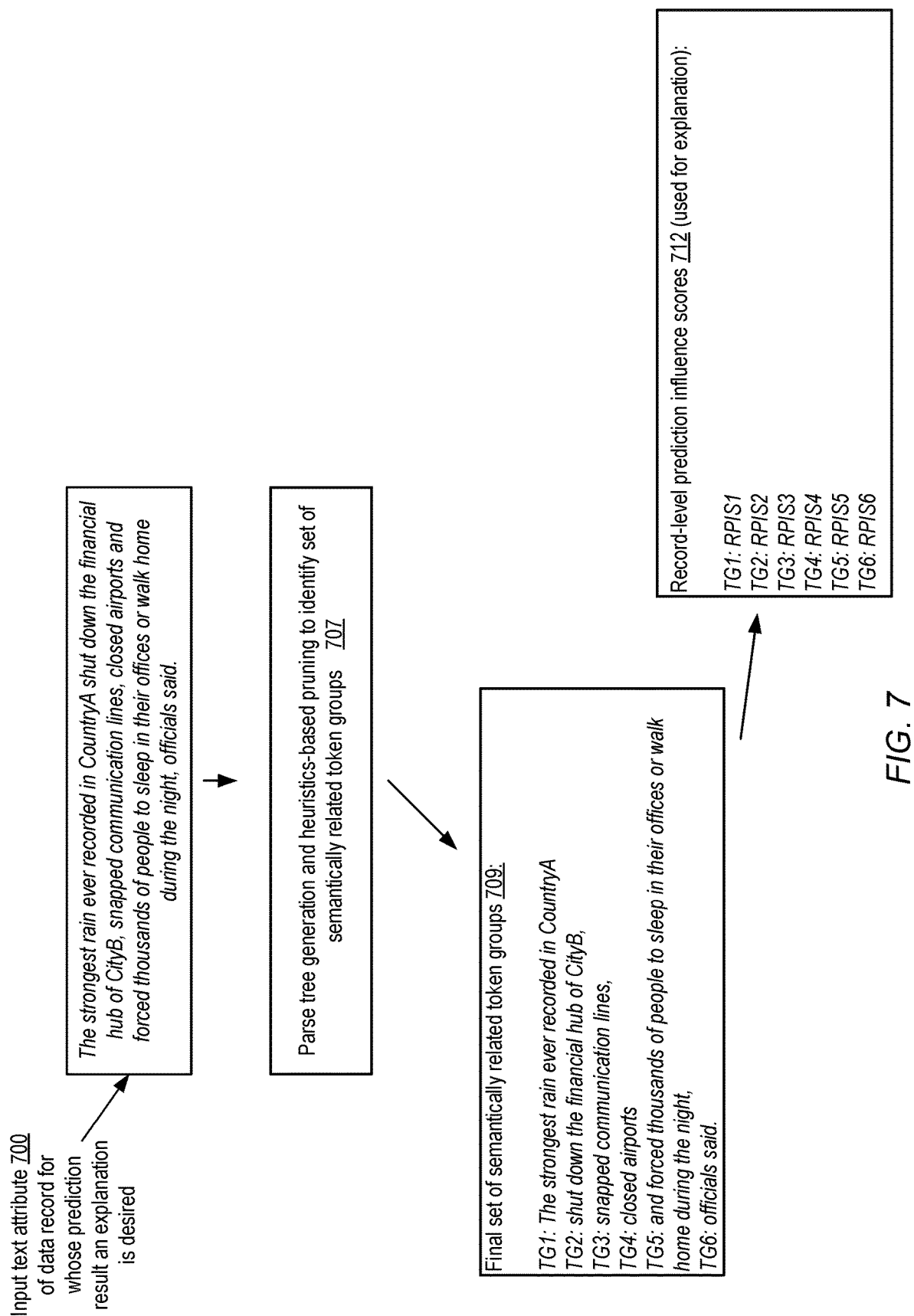
FIG. 7 illustrates examples of semantically related token groups which may be generated from a text attribute of a machine learning input data record applying a pruning algorithm to a parse tree representation of the text attribute, according to at least some embodiments.

FIG. 7 illustrates examples of semantically related token groups which may be generated from a text attribute of a machine learning input data record applying a pruning algorithm to a parse tree representation of the text attribute, according to at least some embodiments. In the example shown in FIG. 7, the input text attribute 700 for which an explanation of a prediction is desired is identical to the text attributes discussed in the context of FIG. 4 and FIG. 5. A parse tree (similar to that shown in FIG. 5) may be constructed and then pruned using heuristics of the kind discussed in FIG. 6, and a set of semantically related token groups may thereby be identified (element 707).

The final set of semantically related token groups 709 identified from the text attribute using the above methodology comprises just six token groups TG1 through TG6 (in contrast to the 26 chunks shown in FIG. 4, which may have been identified using a conventional chunking methodology). Comparing the six token groups to the chunks extracted from the same text and shown in FIG. 4, it should be apparent that the six token groups represent higher-level concepts than the chunks, and are thus likely to be more appealing and useful to humans with respect to the granularity at which explanations are provided for a model's prediction. Respective record-level prediction influence scores 712 may then be generated for each of the token groups, and used for the explanatory data set provided with respect to the record containing the original text attribute 700.

Figure 8:
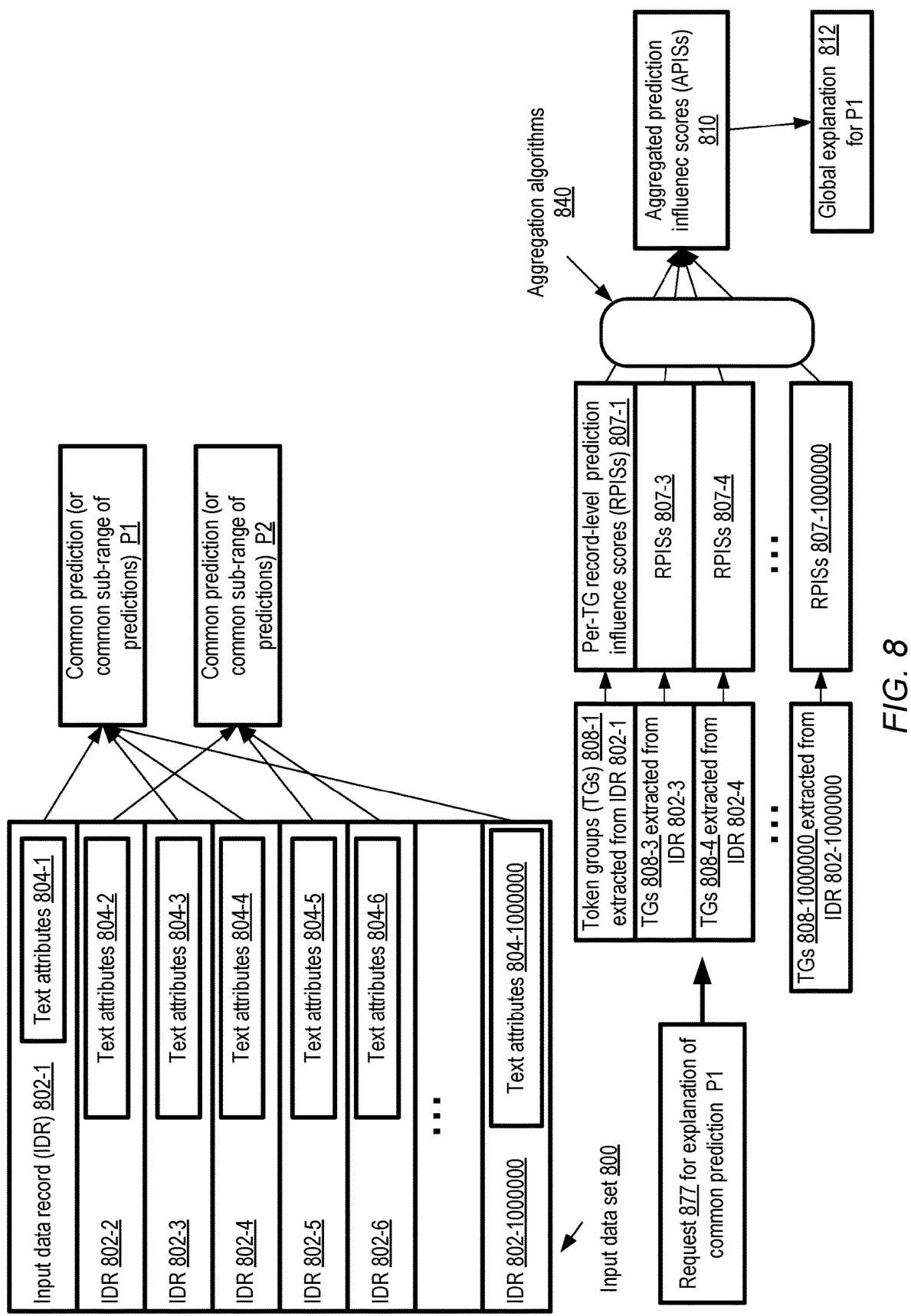
FIG. 8 illustrates an overview of a technique for generating global explanations for machine learning model predictions generated for multiple input data records containing text attributes, according to at least some embodiments.

FIG. 8 illustrates an overview of a technique for generating global explanations for machine learning model predictions generated for multiple input data records containing text attributes, according to at least some embodiments. In the embodiment shown in FIG. 8, an input data set 800 comprising input data records (IDRs) 802-1 through 802-1000000 may be processed by a machine learning model such as a classifier. Individual ones of the IDRs may comprise one or more text attributes 804, such as attributes 804-1 through 804-1000000, each of which may in turn comprise some number of text tokens. The model may generate a common prediction P1 (e.g., a predicted class membership) for some subset of the IDRs, such as 802-1, 802-3, 802-4 and 804-1000000, and a different common prediction P2 for a different subset of the IDRs such as 802-2, 802-5, and 802-6. In some cases, for example if the predictions are numeric, P1 and P2 may each comprise a sub-range of predictions that are close to each other—e.g., P1 may represent predicted values in the sub-range 0.8-1.0 out of a possible range of predictions between 0.0 and 1.0, while P2 may represent predicted values in the sub-range range 0.0-0.2. As such, the term "common prediction" may not necessarily be restricted to an identical value predicted for all the corresponding records, but may be applied to predictions that satisfy a similarity criterion relative to each other.

A request 877 for an explanation of the common prediction P1 may be received at an MLs similar to MLS 101 of FIG. 1 in the depicted embodiment. To prepare an explanatory data set, respective collections of semantically related token groups (TGs) 808-3, 808-3, 808-4, 808-1000000 etc. may be extracted from the text attributes of the IDRs for which the common prediction P1 was generated by the model in the depicted embodiment. For example, depending on the selected granularity for token grouping (which may be indicated by the client on whose behalf the analysis is being performed, a tree pruning methodology similar to that described above may be used to extract the TGs).

For each such TG of each record, a respective per-TG record-level prediction influence score may be generated, resulting in the computation a set of RPISs 807-1, 807-3, 807-4 and 807-1000000 for the different records. SHAP-based techniques may be used in some embodiments to estimate the RPISs. In some cases, the same TG may be present multiple times in a given IDR, e.g., within the same text attribute or across multiple attributes, and the MLS may combine the prediction level scores of the multiple occurrences to generate the record-level prediction influence score for that TG. After the RPISs have been generated for the TGs of the different IDRs, an aggregation algorithm 840 may be used to generate, for each TG, a respective aggregated prediction influence score (APIS) 810. In some embodiments, for example, the mean or the median RPIS for a given TG across all the IDRs in which the TG appears may be computed and used as the APIS for that TG. The APISs may then be used to prepare an explanatory data set which serves as a global explanation 812 for P1 in the depicted embodiment. In scenarios in which a given TG appears multiple times within a given IDR and also occurs in multiple IDRs, two levels of aggregation of prediction influence scores may thus be performed in some embodiments: aggregation at the local or per-record level, and then aggregation at the global or across-multiple-records level. In at least one embodiment, a different set of one or more granularities may be specified by an MLS client for record-level explanations, as opposed to the set of one or more granularities at which global explanations are provided. For example, a client may request and obtain record-level explanations at the sentence level, while global explanations may be requested and obtained at the phrase level. In some cases, the probability of a given phrase occurring in multiple records may be higher in general than the probability of a given sentence occurring in multiple records, which may make it more reasonable to request global explanations at the phrase level instead of the sentence level. Using algorithms such as those described above (e.g., extensions of SHAP algorithms, Integrated Gradients, and/or Layer-wise Relevance Propagation) which have the property that prediction influence scores for multi-token groups can be obtained from the respective prediction influence scores, the MLS may be able to generate predictions at the respective granularities for record-level versus global explanations in various embodiments.

Figure 9:
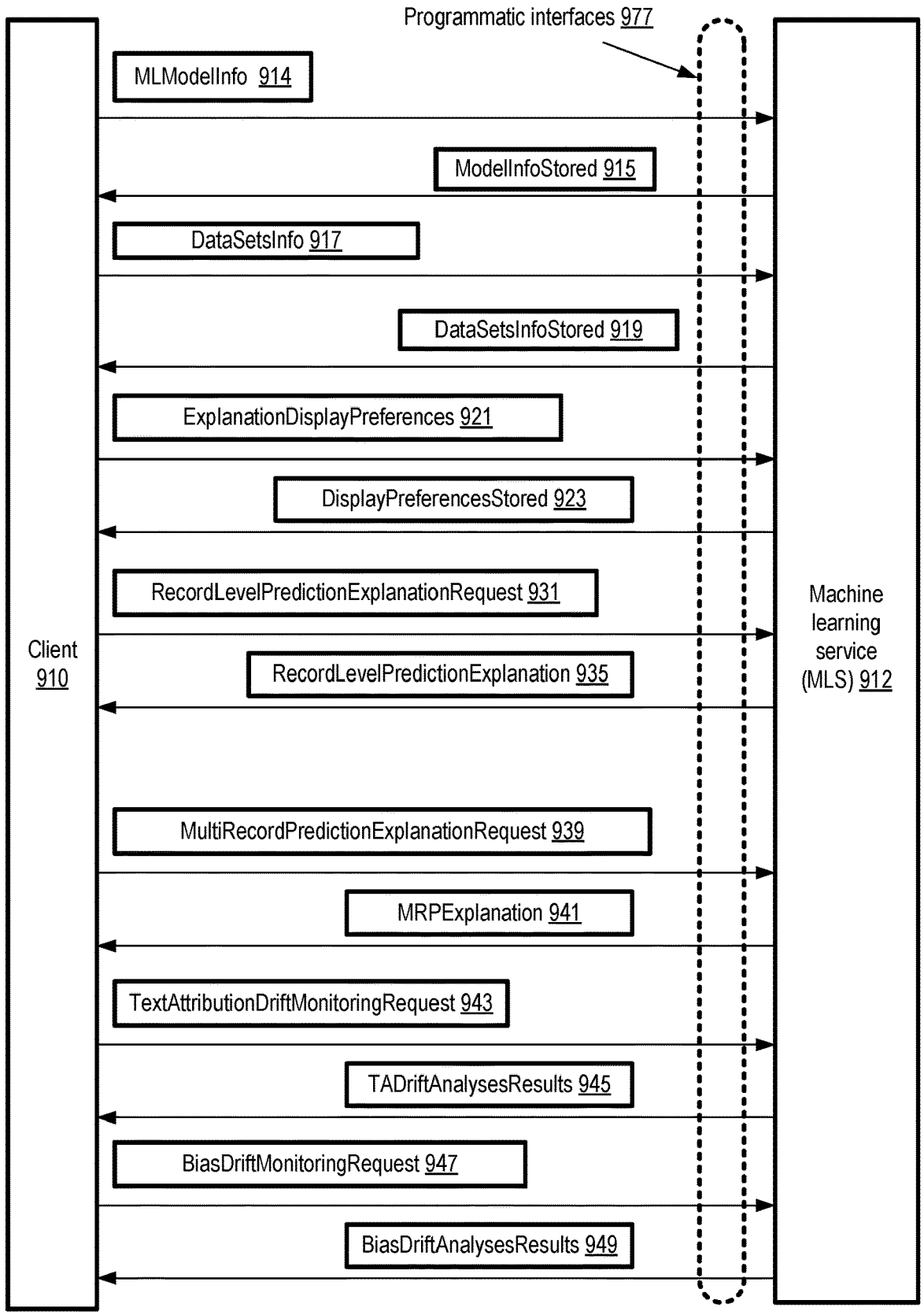
FIG. 9 illustrates example programmatic interactions between clients and a machine learning service, according to at least some embodiments.

FIG. 9 illustrates example programmatic interactions between clients and a machine learning service, according to at least some embodiments. An MLS 912 similar in features and functionality to MLS 101 of FIG. 1 may implement a set of programmatic interfaces 977 in the depicted embodiment, which can be used by MLS clients 910 to submit requests and messages pertaining to machine learning model preparation and use, including requests related to model result explanations, imbalance analysis and post-deployment monitoring, and to receive corresponding responses. The programmatic interfaces 977 may include, for example, one or more web-based interfaces, command-line tools, graphical user interfaces, sets of application programming interfaces (APIs) and the like in different embodiments.

A client 910 may provide information to the MLS 912 via an MLModelInfo message 914 about a model for which explanations and/or post-deployment monitoring is to be performed. In some cases, the model may have been trained with the help of the MLS, and so the client may simply indicate the model's identifier. In other cases, a model trained without the help of the MLS may nevertheless be analyzed with the help of the MLS, e.g., after the client provides an executable version of the model to the MLS. Note that at least in some cases, internal details of the model may not necessarily be provided to the MLS or be known at the MLS; explanation analysis and/or post-deployment analysis may be performed by the MLS in such cases by treating the model as a black box from which predictions for input records can be obtained, without requiring a detailed understanding of the model's prediction algorithm, hyperparameters etc. The information about the model may be stored at a repository of the MLS, and a ModelInfoStored response message 915 may be sent to the client from the MLS in some embodiments.

The client may provide information about data sets to be used to (for example) train the model, evaluate the model, generate a baseline behavior profile of the model, and so on, using one or more DataSetsInfo messages 917 in the depicted embodiment. The information may be added to the MLS's repository, and a DataSetsInfoStored response message may be sent to the client 910 in some embodiments.

In some embodiments, a client may provide preferences for the kinds of explanatory displays to be used for text-based explanations of model predictions via one or more ExplanationDisplayPreferences messages 921. For example, some clients may wish to view prediction influence scores of token groups in a tabular format, others may wish to view heat maps, and so on. The preferences may be saved at the MLS, and a DisplayPreferencesStored message 923 may be sent to the client. Note that in some embodiments, the clients may use the programmatic interfaces 977 to dynamically request changes to the display format—e.g., if upon viewing explanatory information in tabular form the client wishes to view a heat map or in-place highlighting of text token groups, the client may indicate the preferred display format in real time.

Clients may submit requests for explanations of predictions for a given input record at a time via one or more RecordLevelPredictionExplanationRequest messages 931 in the depicted embodiment. Parameters such as the model, the record for whose prediction an explanation is desired, the granularity at which text tokens should be combined for the explanations, the format in which the explanation is to be presented, and so on, may be included in messages 931 in at least some embodiments. The MLS may generate an explanatory data set for the record-level prediction, and provide the explanatory data set via one or more RecordLevelPredictionExplanation messages 935 in the depicted embodiment.

A request for an explanation of a prediction (e.g., a common prediction of the kind illustrated in FIG. 8) for multiple records may be submitted via a MultiRecordPredictionExplanationRequest message 939 in some embodiments. Parameters of the request may indicate the model, the set of records for whose predictions explanations are desired, the granularity at which text tokens should be combined for the explanation, explanation display format, etc. The MLS may use techniques such as those described earlier to generate a global explanatory data set for the records, and provide or present the explanatory data set via or more MRPExplanation messages 941 in the depicted embodiment.

According to some embodiments, an MLS client 910 may submit a TextAttributionDriftMonitoring request 943 to request the monitoring of deviations or drift in text-attribute based explanations of a model's post-deployment predictions. The MLS may then begin a process of iteratively monitoring the model's results over various time windows, as described in further detail below, and provide the results of the monitoring to the client via one or more TADriftAnalysisResults 945.

In at least one embodiment, a client 910 may submit a BiasDriftMonitoringRequest 947 to the MLS, requesting that changes in the imbalance or bias characteristics of a specified model's post-deployment results be monitored. The MLS may then begin a process of iteratively monitoring the model's results over various time windows for changes in bias with respect to a baseline profile of the model, as described in further detail below, and provide the results of the monitoring to the client via one or more BiasDriftAnalysisResults 949. In some embodiments a single monitoring request may be submitted by a client to request analysis of drift in both text attribution as well as bias, instead of using separate requests 947 and 949 as shown in FIG. 9. In various embodiments, a list or set of stop words which are not to be included in the token groups used for record-level prediction influence scores, global or multi-record prediction influence scores, and/or used for drift analysis may be provided via programmatic interfaces by the client, and the MLS may verify that the results provided to the client do not include or rely on token groups that contain the stop words (e.g., stop words may be stripped from the token groups). In at least some embodiments, some or all of the client's requests shown in FIG. 9 may be processed at software containers prepared by the MLS and provided to the client 910. In some cases, the MLS may provide access to a cluster of containers to perform at least some portion of the requested tasks in parallel. Note that in some embodiments, programmatic interactions other than those shown in FIG. 9 may be supported by an MLS for operations associated with text-based explanations and monitoring of machine learning models.

As mentioned above, in various embodiments clients of an MLS may select the granularities at which tokens of text attributes should be grouped for the purposes of explaining model predictions, and then view the corresponding explanatory data sets via graphical interfaces or visualization interfaces. FIG. 10, FIG. 11, FIG. 12 and FIG. 13 collectively illustrate examples of graphical displays of explanatory information pertaining to machine learning predictions generated for input containing text attributes, according to at least some embodiments. FIG. 10 shows a record-level explanation example 1001 using in-place highlighting. Interface 1077 (such as web-based interface) may include an introductory section 1004 followed by a display of a text-based attribute of a record for whose prediction the explanation is being provided. The introductory section 1004 may indicate the text attribute TA (on the basis of whose analysis the prediction was at least partially generated), the prediction result P, and the record R. Introductory section 1004 may also indicate that phrases of the text attribute (the granularity at which the tokens were grouped for the purpose of explaining the prediction) are highlighted in red and yellow, with red indicating higher prediction influence and yellow indicating somewhat lower but still substantial prediction influence. The viewer may also be informed that more details such as the actual attribution scores for each highlighted phrase may be obtained by hovering a cursor over the phrases in the depicted example scenario.

The text tokens 1005 of the attribute may be displayed in the sequence in which they were provided as input, and different token groups (phrases) may be shown with red highlighting 1002 (as for the phrase comprising word2 word3 and word4, or the phrase comprising word15 and word16) or yellow highlighting 1003 (as for the phrase comprising word18 word19 and word20) to indicate their relative prediction influence. Any of several techniques may be used for the highlighting in different implementations: for example, the background of the phrases may be shown in the colors red or yellow, the font colors of the words of the phrases may be set to red or yellow, etc. Showing the significant phrases (from the perspective of explaining the prediction) in their original sequences without separating them from the rest of the tokens of the text attribute may be helpful to MLS clients in understanding the contextual relevance of the phrases in the depicted embodiment, which may in turn help in understanding why the prediction was generated.

In FIG. 11, a record-level explanation example 1101 using a heat map is shown. Interface 1177 may comprise an introductory section 1104 indicating the significance of the colors of the heat map (e.g., that darker colors show greater predictive influence), and may also indicate the text attribute TA, the prediction P for which the heat map is generated, and the record R of which TA is a part. In the heat map 1107, different token groups may have background colors and/or font colors representing relative amounts of "heat" or influence levels. The heat map may differ from in-place highlighting in that respective prediction influence of all parts of the text attribute may be shown in the heat map, whereas only the most significant phrases may be highlighted in the in-place highlighting approach.

In FIG. 12, a record-level explanation example 1201 using a phrase cloud is shown. Interface 1277 of the MLS may comprise an introductory section 1204 indicating the text attribute TA and the record R for which a prediction P is generated based at least in part on analysis of TA. In the phrase cloud 1207, the relative sizes of the fonts used for different token groups may indicate the relative extents of prediction influence of the token groups in the depicted embodiment. Phrase clouds may also be referred to as word clouds.

Figure 13:
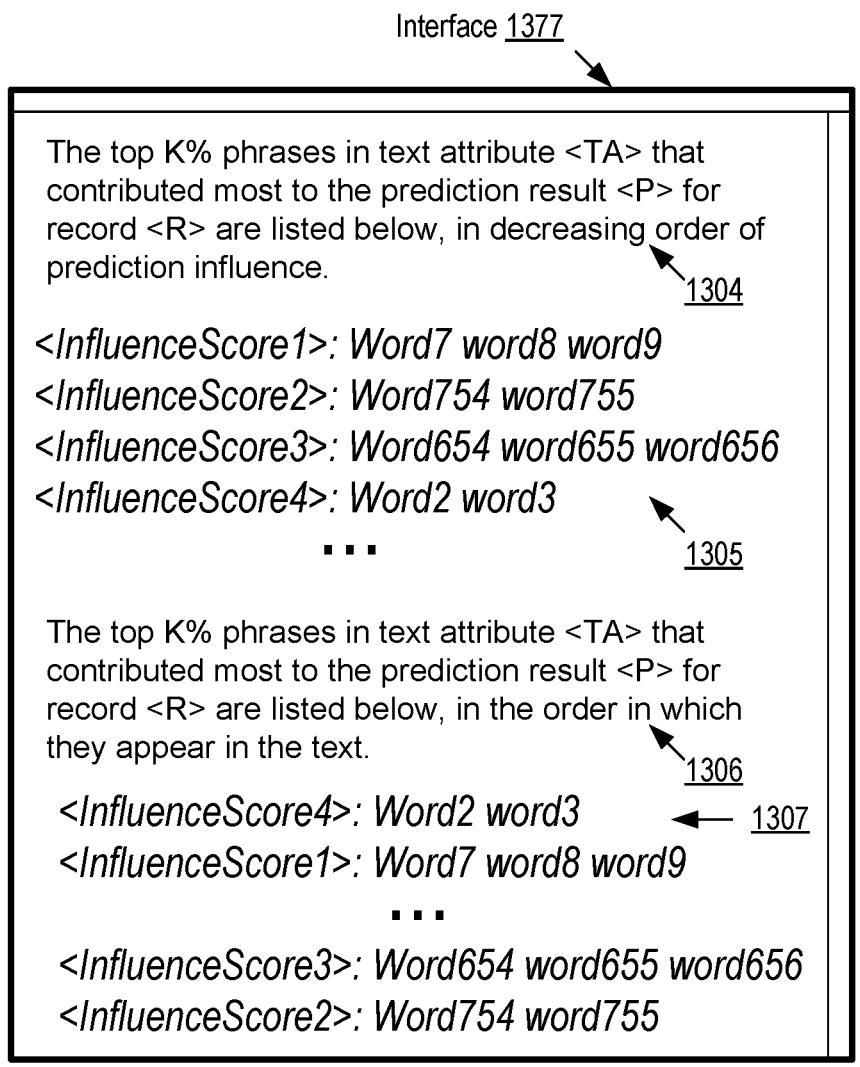

Interface 1377 shown in FIG. 13 illustrates two additional approaches towards displaying record-level explanations of predictions generated for records containing text attributes which may be employed at an MLS in some embodiments. Introductory section 1304 of the interface explains that the top K % phrases in a text attribute TA which contributed most to the prediction result P for a record R are listed below (in section 1305 of the interface) in decreasing order of prediction influence. The prediction influence scores (e.g., InfluenceScore1, InfluenceScore2, etc.) may be displayed along with the token groups (e.g., "Word7 word8 word9") in this first approach. In an alternative approach indicated via introductory section 1306, the top K % most influential token groups may also be displayed; however, they may be displayed in section 1307 in the order in which the token groups appeared in the record, and not in decreasing order of influence scores. As mentioned earlier, MLS clients may indicate which particular presentation style or format they wish to view the explanations of the predictions, as well as the token grouping granularity (e.g., phrase/clause, sentence, paragraph, individual token, etc.) in different embodiments. While displays of single-record explanatory data sets are shown by way of example in FIG. 10, FIG. 11, FIG. 12 and FIG. 13, similar display methodologies/styles may be utilized for explanations of common predictions for multiple records as well in at least some embodiments.

Figure 14:
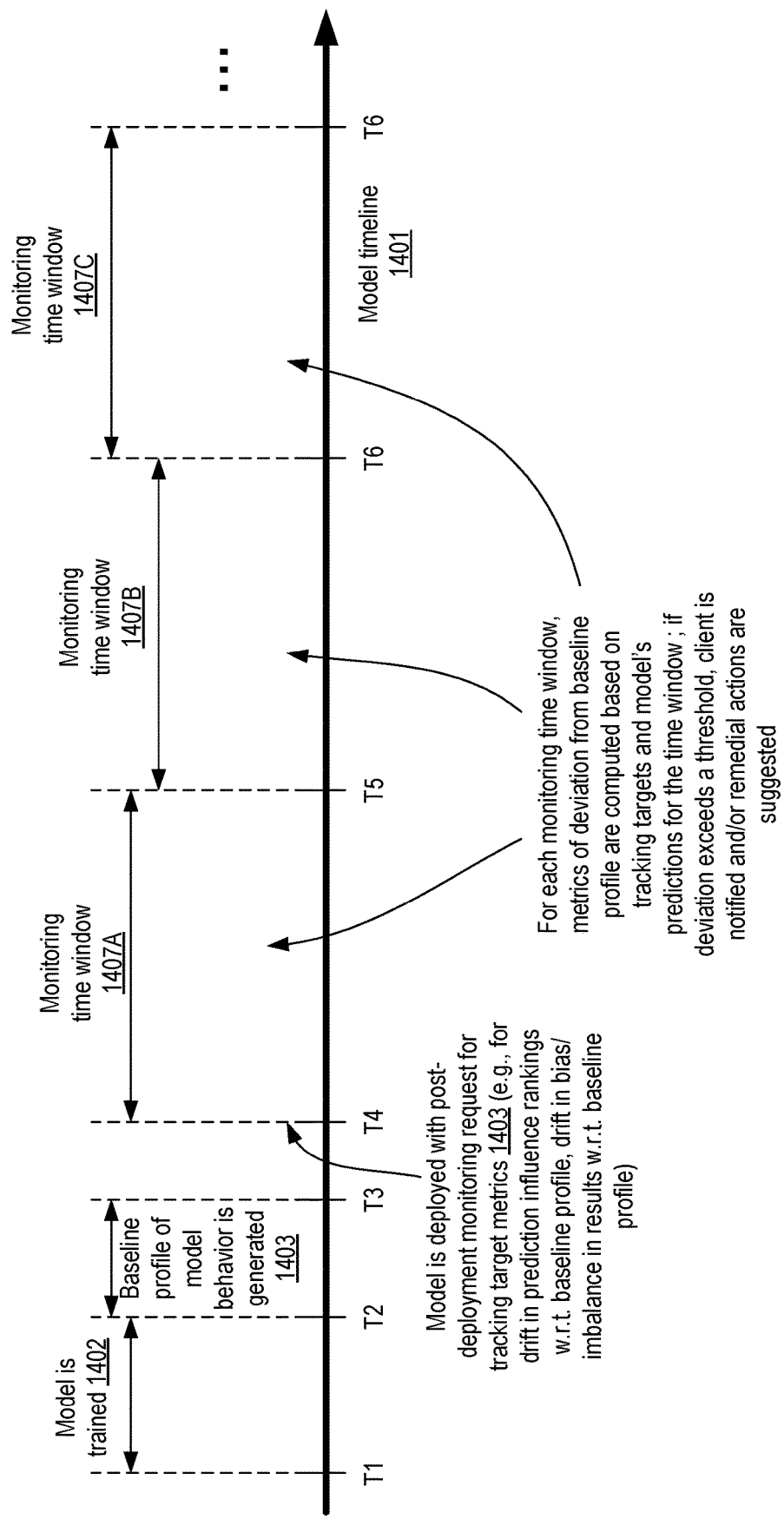
FIG. 14 illustrates an example timeline illustrating post-deployment periods in which deviations of machine learning model behavior with respect to a baseline profile may be detected, according to at least some embodiments.

As mentioned earlier, in various embodiments clients of an MLS with features and functions similar to those of MLS 101 of FIG. 1 may wish to monitor the behavior of trained machine learning models after the models have been deployed. FIG. 14 illustrates an example timeline illustrating post-deployment periods in which deviations of machine learning model behavior with respect to a baseline profile may be detected, according to at least some embodiments. A machine learning model may be trained in the interval between T1 and T2 along model timeline 1401 in the depicted embodiment, as indicated by arrow 1402, e.g., using resources such as one or more software containers provided by the MLS. The records of the training data set may include at least some text attributes, and NLP algorithms may be used to analyze the text attributes to generate model predictions in at least some embodiments.

After the model is trained, in some embodiments, a baseline profile of the trained model's behavior may be generated 1403 between times T2 and T3. The baseline profile may be generated, for example, by providing a reference data set as input to the model using resources of the MLS, and characterizing the predictions generated from the reference data set along various dimensions such as predictive influence of the features (including text token groups combined at client-specified granularities) of the records of the reference data set, the extent to which the predictions are imbalanced (biased) with respect to subgroups of the reference data set records, and so on. A number of attribution or prediction influence metrics may be captured in the baseline profile, along with a number of imbalance metrics. In at least some embodiments, the MLS client on whose behalf the model is trained may provide the reference data set (e.g., as part of a model training request) as well as parameters to be used to generate the baseline profile (such as the granularities at which text tokens are to be grouped for explanation and/or bias analysis). In some embodiments, the baseline profile of the model may be updated from time to time—e.g., instead of just generating one profile prior to deployment and using that same profile as the basis for detecting behavior drift, the profile may be re-generated or updated using new reference data (which may be specified by the client in some cases) periodically or at times chosen by the MLS or the client.

A set of tracking metrics may be identified for post-deployment analysis of drift or excessive variation in the model's behavior, relative to a baseline profile, in various embodiments by the MLS client. The tracking metrics may include, for example, one or more feature attribution or prediction influence score-related metrics, and/or one or more imbalance/bias related metrics, defined with respect to, or derived from, one or more of the text-token based metrics captured in the baseline profile. In one example scenario, the baseline profile may indicate a top-20 list of text phrases with the highest prediction influence scores among the text phrases identified from a text attribute according to a client-specified token grouping granularity, a tracking metric may comprise the order in which those top-20 phrases appear in the baseline profile, or the absolute values of the prediction influence scores of the top-20 phrases in the baseline profile. In some cases, the tracking metrics may simply represent a subset (or all) of the metrics captured in the baseline profile.

Along timeline 1401, the trained model for which the baseline profile has been generated may be deployed at time T4 in FIG. 14. The client may submit a post-deployment monitoring request for specified tracking metrics, so that (for example) drift in the prediction influence rankings with respect to the baseline profile, and/or drift in biases/imbalances in prediction results with respect to the baseline profile can be detected in the depicted embodiment. In some embodiments, the client may specify time windows over which the behavior of the model should be tracked and analyzed. For example, all the predictions generated by the deployed model within the time window 1407A (between T4 and T5) may be analyzed as a group for drift with respect to the baseline profile, the set of predictions generated by the deployed model within the time window 1407B (between T5 and T6) may be analyzed as a group for drift with respect to the baseline profile, the set of predictions generated by the deployed model within the time window 1407C (between T6 and T7) may be analyzed as a group for drift with respect to the baseline profile, and so on.

For each such time window, the MLS may generate one or more metrics of deviation from the baseline profile based on the tracking metrics and the model's predictions within that time window in the depicted embodiment. If the deviation exceeds a threshold, the client may be notified and/or remedial actions (such as retraining the model using a more representative training data set, generating a more relevant baseline profile using a more representative reference data set, etc.) may be recommended by the MLS in at least some embodiments. The deviation threshold used for reporting/notifying the client may be specified by the client in at least some embodiments, e.g., along with the tracking metrics. Note that because the total number of predictions made within a given time window may differ from the number of predictions made in other time windows, statistical analysis may be required to determine confidence levels associated with the measured deviations from the reference behavior in at least some embodiments. In some embodiments, a bootstrap confidence interval generation algorithm may be employed for such statistical analysis. In at least one embodiment, normalized discounted cumulative gain (NDCG) may be computed to determine whether the metric of deviation satisfies the threshold criterion.

FIG. 15 illustrates an example of the kinds of machine learning model behavior deviation metrics which may be detected and reported, according to at least some embodiments. In the embodiment corresponding to FIG. 15, an MLS client may wish to be notified, e.g., via an alarm or other notification, if the prediction influence scores of the top few most influential token groups change from the baseline profile prediction influence scores 1504 for a particular model after the model is trained and deployed. As such, the tracking metrics for the post-deployment monitoring of the model's behavior may for example include (a) the top three token groups with the highest prediction influence scores, (b) the absolute values of the prediction influence scores of the top three token groups and/or (c) changes (if any) to the rankings of the top three token groups, assuming the same three token groups remain ranked as the top three.

In the baseline profile generated using a reference data set for the model, the top three token groups 1502, whose grouping granularity (e.g., phrase/clause level granularity) may be selected by the MLS client on whose behalf the model is being monitored, may include the token groups "word6 word7 word8", "word67 word 68" and "word33 word34 word35" in the depicted example scenario. The respective baseline profile prediction influence scores 1504 of the three token groups, computed from the reference data set, may be 0.20 (for "word6 word7 word8"), 0.10 (for "word67 word68") and 0.05 (for "word33 word34 word35").

After the model is deployed, e.g., for production use, its predictions for various new input data records during various time intervals may be analyzed and the prediction influence scores for token groups at the same granularity may be re-estimated for each time window in the depicted embodiment. In a particular time window TW1, the top three token groups may remain the same as in the baseline profile, and the post-deployment prediction influence scores 1506A computed for TW1 may be 0.18 (for "word6 word7 word8"), 0.11 (for "word67 word 68") and 0.05 (for "word33 word34 word35"). Thus, in the depicted example, the identities of the top three token groups have not changed between the baseline profile and TW1, the relative rankings of the top three token groups also remain the same, and while there is a small change in the absolute values of two of the three scores, this difference may not be sufficient to require a notification.

In contrast, for a subsequent time window TW2, the prediction influence scores 1506B for the top three token groups have changed to a greater extent. While the same three token groups remain members of the top three token groups, their relative ranking has changed—now, "word33 word34 word35" has a score of 0.45 and is the most influential of the three, "word67 word 68" has a score of 0.25 (much higher than in the baseline profile) and is in second place, while "word6 word7 word8" has a much lower score of 0.04 than it did in the baseline profile and is now in third place. As such, the changes in the prediction influence scores may be sufficient to cause an alarm to be generated for time window TW2. The decision as to whether the threshold criterion for generating an alarm or notification with respect to prediction influence scores may be based in some embodiments on computing a deviation metric such as normalized discounted cumulative gain (NDCG). If the NDCG (which may be computed using formulas similar to those introduced in the context of FIG. 2) falls below a threshold value selected by the MLS or specified programmatically by an MLS client, an alarm may be raised in some embodiments.

Figure 16:
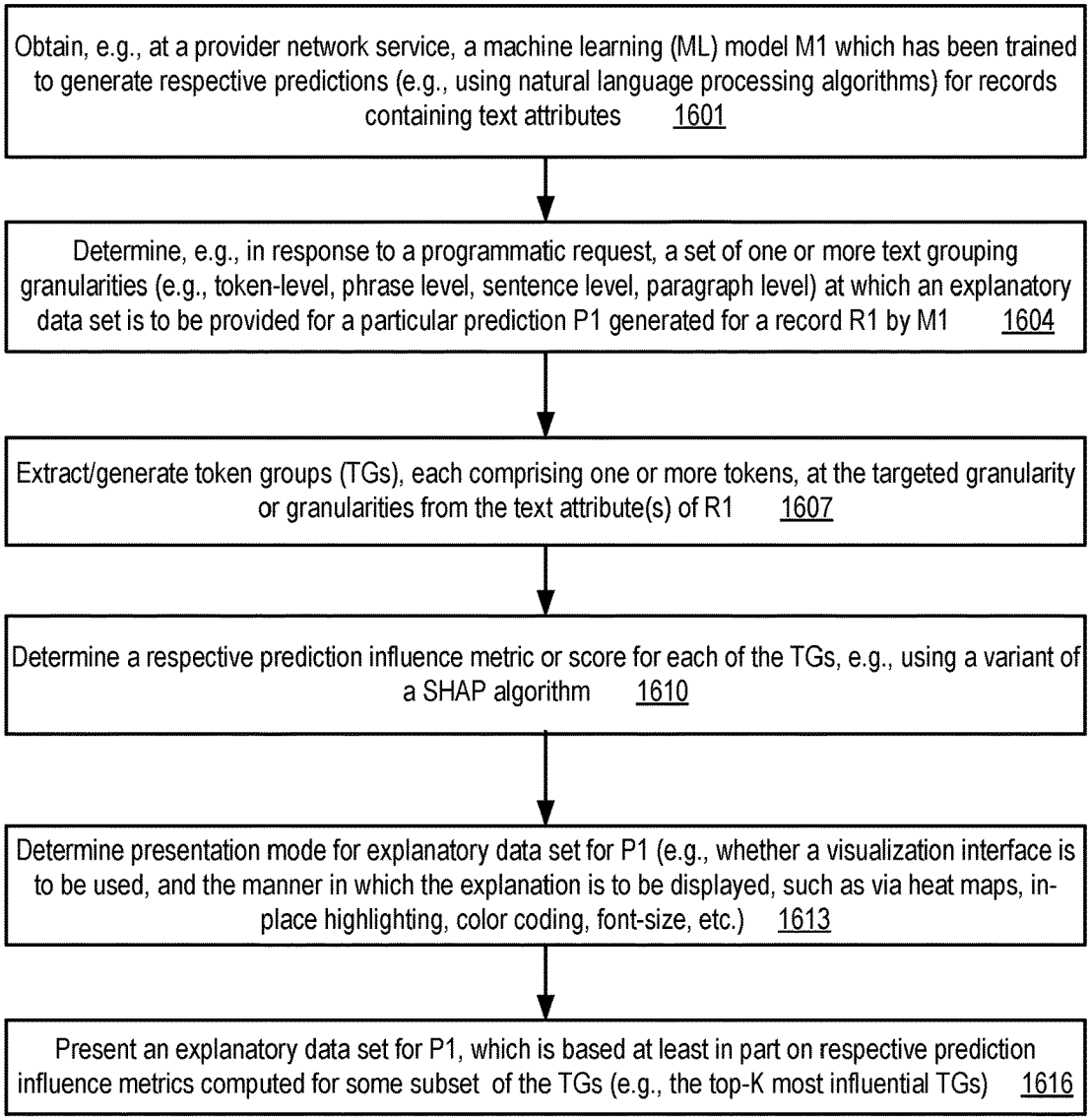
FIG. 16 is a flow diagram illustrating aspects of operations that may be performed to generate and visualize explanations for record-level machine learning model predictions at client-specified text token group granularities, according to at least some embodiments.

FIG. 16 is a flow diagram illustrating aspects of operations that may be performed to generate and visualize explanations for record-level machine learning model predictions at client-specified text token group granularities, according to at least some embodiments. As shown in element 1601, a machine learning model M1 which has been trained to generate respective predictions (e.g., with the help of natural language processing (NLP) algorithms) for data records containing one or more text attributes may be obtained at an MLS similar in features and functionality to MLS 101 of FIG. 1. A given text attribute may comprise several different text tokens in some embodiments; for example, the attribute may contain all the tokens of a multi-page document or article. In some cases, the model M1 may be trained at the MLS in response to a programmatic request from an MLS client.

A determination may be made at the MLS, e.g., in response to one or more programmatic requests from an MLS client, of a set of one or more text grouping granularities (e.g., token-level, phrase-level, sentence-level or paragraph-level) at which an explanatory data set is to be provided for a particular prediction P1 generated for a record R1 by the model M1 (element 1604). A collection of token groups (TGs) at the targeted granularity or granularities may be extracted/generated from the text attribute(s) of R1 in the depicted embodiment at the MLS, e.g., via code running in a software container prepared for explanation-related analysis by the MLS to which the MLS client is provided access by the MLS (element 1607). Depending on the granularity, techniques similar to the heuristics-based pruning of parse trees of the kind discussed earlier may be employed in some embodiments to extract the TGs.

A respective prediction influence metric or score may then be generated corresponding to at least some of the extracted TGs in various embodiments (element 1610). A variant of a SHAP algorithm, in which for example coalitions comprise multiple tokens as discussed earlier, may be used in some embodiments to determine the prediction influence scores or attribution scores. In other embodiments, an algorithm similar to Integrated Gradients and/or Layer-wise Relevance Propagation may be employed.

A presentation mode for providing an explanatory data set pertaining to the prediction P1, based on the prediction influence scores, may be determined at the MLS in various embodiments (element 1613). For example, a decision to use a visualization or graphical interface similar to the interfaces shown in FIG. 10-FIG. 13 may be made, and the manner in which the explanatory information is to be displayed (e.g., via in-place highlighting, heat maps, word or phrase clouds, color coding, font size, etc.) may be chosen. In some embodiments, the MLS client on whose behalf the explanatory data set is generated may provide input which can be used at the MLS to determine various parameters of the presentation mode. An explanatory data set for P1, which consists of or is derived at least in part from the prediction influence scores for at least a subset of the TGs (e.g., the top K % or the top K most influential TGs) combined at a targeted granularity selected by the MLS client, may then be presented in accordance with the presentation mode to the MLS client.

Figure 17:
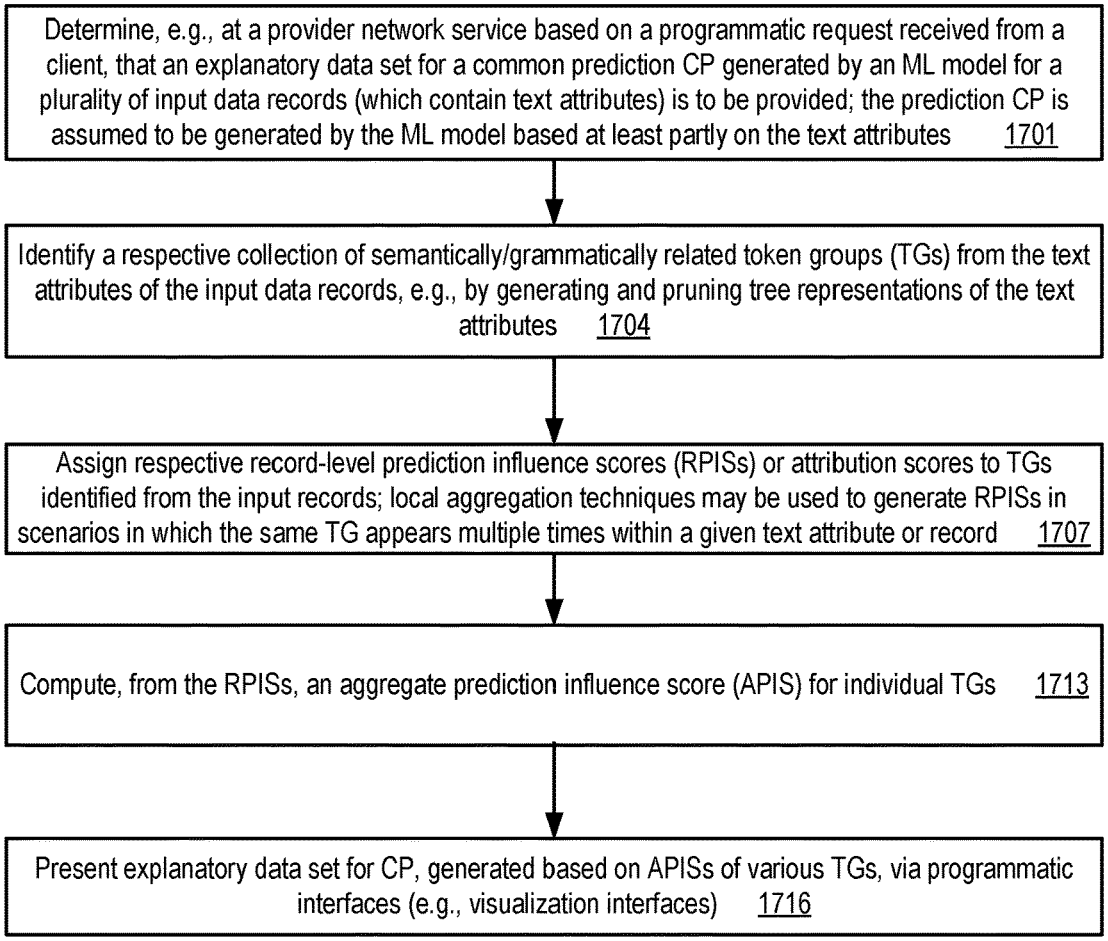
FIG. 17 is a flow diagram illustrating aspects of operations that may be performed to generate global explanations for machine learning model predictions at client-specified text token group granularities, according to at least some embodiments.

FIG. 17 is a flow diagram illustrating aspects of operations that may be performed to generate global explanations for machine learning model predictions at client-specified text token group granularities, according to at least some embodiments. The term "global" may be used to refer to explanations for a set of predictions generated for multiple input data records by a machine learning mode, in contrast to explanations for record-level predictions. A determination may be made, e.g., at an MLS similar in features and functionality to MLS 101 of FIG. 1, that an explanation or explanatory data set for a common prediction CP generated by an ML model for a plurality of input data records is to be provided (element 1701). The determination may be made, for example, in response to one or more programmatic requests received from an MLS client in some embodiments. At least some of the input records may include text attributes, and the prediction CP may be generated at least partly from the input records using NLP algorithms in various embodiments.

A respective collection of semantically or grammatically related token groups (TGs) may be extracted from the text attributes of individual input data records in the depicted embodiment (element 1704). In some implementations, depending on the granularity at which tokens in the input text are to be combined for explanation purposes, a parse tree may be generated from respective sentences of the text attributes, and a heuristic-based pruning algorithm of the kind introduced above may be used to identify the TGs.

Respective record-level prediction influence scores (RPISs), also referred to as feature attribution scores, may be assigned to individual ones of the TGs in various embodiments (element 1707). In at least one embodiment, variants of SHAP based techniques of the kind discussed earlier (e.g., extensions of SHAP from token-level prediction influence scores to multi-token prediction influence scores), Layer-wise Relevance Propagation and/or Integrated Gradient techniques may be used to determine the RPISs. If a given input data record happens to include multiple occurrences of the same TG, in one embodiment a local aggregation technique may be applied to generate an RPIS for that TG—e.g., the maximum, median or mean of the per-occurrence prediction influence scores for the different occurrences may be chosen as the RPIS.

In at least some cases, a given TG may occur within multiple input data records for which the common prediction CP was generated by the model. In various embodiments, from the RPISs corresponding to a given TG and each such record, an aggregate prediction influence score (APIS) for the TG may be generated (element 1713). For example, the mean or median value of the RPISs of the TG for the different records containing the TG may be computed and used as the APIS in one embodiment. Note that if a TG appears in only a single input data record, its RPIS may be used as its APIS in some embodiments. An explanatory data set for the common prediction CP, generated at least in part from the APISs of one or more different TGs, may be presented via programmatic interfaces of the MLS to an MLS client (element 1716). For example, the top K or the top K % most influential TGs (as indicated by their respective APISs) with respect to the common prediction CP may be selected, and information about them may be presented via a visualization interface of the kind discussed above in some embodiments. Clients of the MLS may provide values for various parameters of the explanation procedure, including for example an indication of the model whose common prediction is to be explained, the common prediction itself, the granularity or granularities at which the tokens of text attributes are to be combined for the explanatory data set, the presentation mode to be used for the explanatory data set, how RPISs are to be aggregated to generate APISs, and the like.

Figure 18:
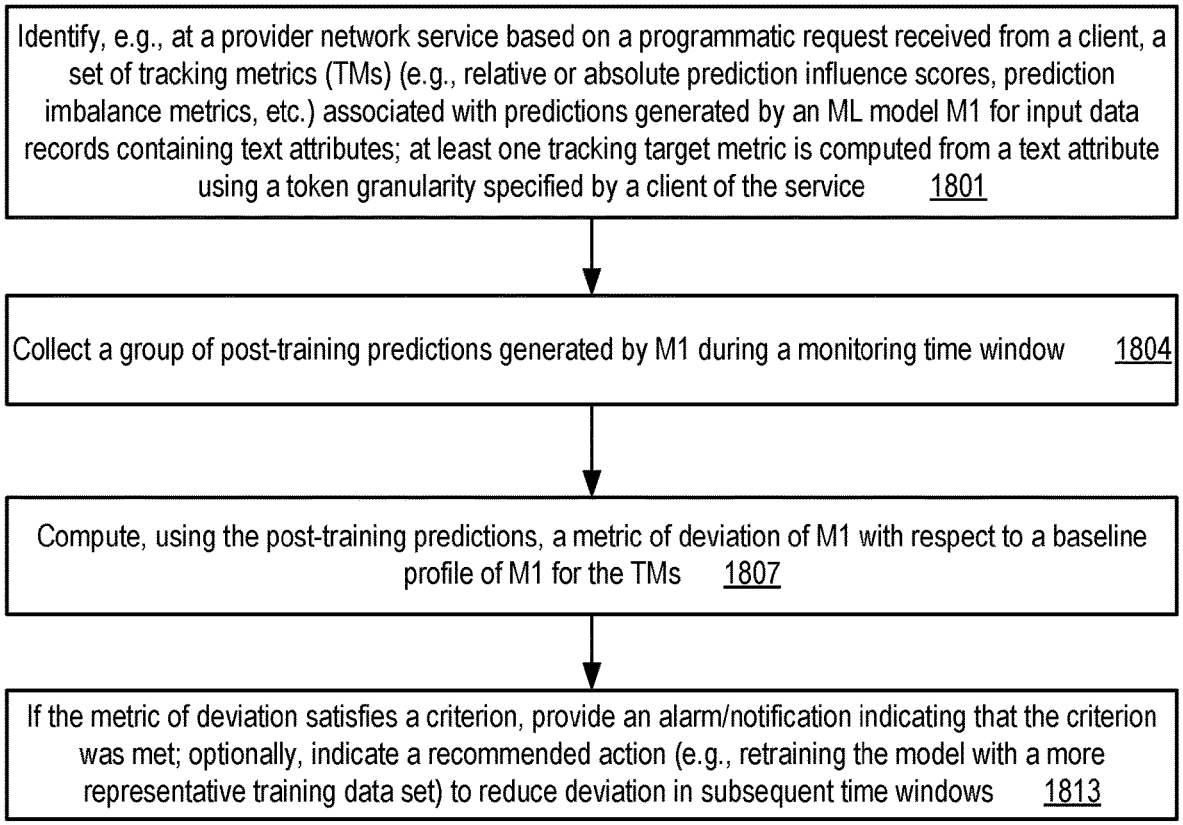
FIG. 18 is a flow diagram illustrating aspects of operations that may be performed to detect and report post-deployment deviations in machine learning model behavior for input records containing text attributes, according to at least some embodiments.

FIG. 18 is a flow diagram illustrating aspects of operations that may be performed to detect and report post-deployment deviations in machine learning model behavior for input records containing text attributes, according to at least some embodiments. As shown in element 1801, a set of tracking metrics (TTMs) associated with predictions made post-deployment by a machine learning model M1 for records containing text attributes may be identified, e.g., at a provider network service similar to MLS 101 of FIG. 1. The TTMs may include, for example, relative or absolute prediction influence scores, prediction imbalance/bias metrics and the like, at least some of which may be computed from a text attribute of the input data records provided to the model, with the tokens of the text attributes combined at a granularity (e.g., phrase-level, sentence-level or paragraph-level granularity) selected by the MLS client on whose behalf the metrics are to be tracked. The model M1, the TTMs, and/or various other parameters of the analysis (such as the durations of time windows for monitoring accumulated predictions made during the time windows) may be specified by the MLS client in different embodiments. In some embodiments an MLS client may specify a set of stop words to be used for the tracking metrics and the post-deployment monitoring, and the MLS may ensure that tracking metrics are not computed for token groups which include the stop words (e.g., the token groups from which the tracking metrics are obtained may be stripped of the stop words).

A group of post-training predictions generated by the model M1 during a given time window may be collected (element 1804). Using the group of collected post-training predictions, a metric of deviation of the M1's behavior relative to a baseline profile of M1 for the TTMs may be computed or estimated (element 1807). The baseline profile may have been generated earlier at the MLS. E.g., using a reference data set specified by the MLS client or identified by the MLS, and the profile may contain values for the TTMs obtained from the analysis of the reference data set by M1. The deviation metric, which may for example be expressed as an acceptable range of one or more TTMs, may be specified by the MLS client in at least some embodiments—for example, the client may indicate that the metric of deviation for a feature attribution or prediction influence ranking comprises an NCDG (normalized discounted cumulative gain).

If the metric of deviation satisfies a criterion (e.g., if it falls outside an acceptable range specified by the MLS client or an acceptable range selected based on heuristics at the MLS), an alarm or notification may be generated and presented to the MLS client via programmatic interface in at least some embodiments (element 1813). In some embodiments, in addition to providing a notification that the criterion was satisfied by the deviation metric, the MLS may provide an indication of one or more recommended actions that may be initiated to reduce the deviation or drift in subsequent time windows—e.g., a recommendation to retrain the model M1 with a more representative data set may be provided, or a recommendation to re-generate the baseline profile with a more representative data set may be provided. In one embodiment, if the client approves a recommended action, the action may be initiated by the MLS.

In some embodiments, as discussed earlier, an MLS client may wish to track whether imbalances or biases in a model's predictions have changed or drifted substantially between a baseline profile and various time post-deployment windows of the model. Because the total number of predictions made during respective time windows may differ, and in some cases may be quite small, a technique to determine confidence levels (such as the computation of bootstrap confidence intervals) associated with imbalance metric measurements in various time windows may be implemented in at least some embodiments, e.g., to ensure that alarms/notifications are raised only if there is a substantial degree of confidence that the estimated drift has actually occurred and is not simply an artifact of the number of predictions made.

FIG. 19 is a flow diagram illustrating aspects of operations that may be performed to detect and report post-deployment deviations in bias metrics using bootstrap confidence interval computations, according to at least some embodiments. As shown in element 1901, a determination may be made, e.g., at an MLS similar in features and functionality to MLS 101 of FIG. 1, of a tracking bias metric b (e.g., difference in positive proportion in predicted labels (DPPL), introduced earlier in the context of FIG. 2) to be monitored for a trained model after the model has been deployed, a time window duration or size t, an acceptable range r for the bias metric, a number of bootstrap iterations n and a fraction f to be used to sample the predictions in a given time window. Some or all of these parameters may be specified by the MLS client in various embodiments; in other embodiments, at least some of the parameters may be selected by the MLS without guidance from the MLS client.

Using a set of p model predictions produced by the model for respective input records during a time window of duration t, the bias metric b may be computed (element 1904) for that time window. Individual ones of the predictions may be based on analysis of text tokens of a text attribute of the records, combined into token groups at a granularity selected/specified by the MLS client. The bootstrap standard deviation sigma of b may be computed by drawing samples of a fraction f*p, n times in the depicted embodiment (element 1907). In some implementations, the sampling may be performed with replacement, while in other embodiments, the sampling may be performed without replacement. The 95% confidence interval C for b may be computed as C=[b−2*sigma, b+2*sigma] (element 1913). If C and the acceptable range r do not overlap, the drift in bias may be assumed to be statistically significant (even if the number of predictions p generated in the time window is small) (element 1916) in the depicted embodiment. An alarm or notification may therefore be raised regarding the drift.

It is noted that in various embodiments, some of the operations shown in the flow diagrams of FIG. 6, FIG. 16, FIG. 17, FIG. 18 and/or FIG. 19 may be implemented in a different order than that shown in the figure, or may be performed in parallel rather than sequentially. Some of the operations shown in FIG. 6, FIG. 16, FIG. 17, FIGS. 18 and/or FIG. 19 may not be required in one or more implementations.

Figure 20:
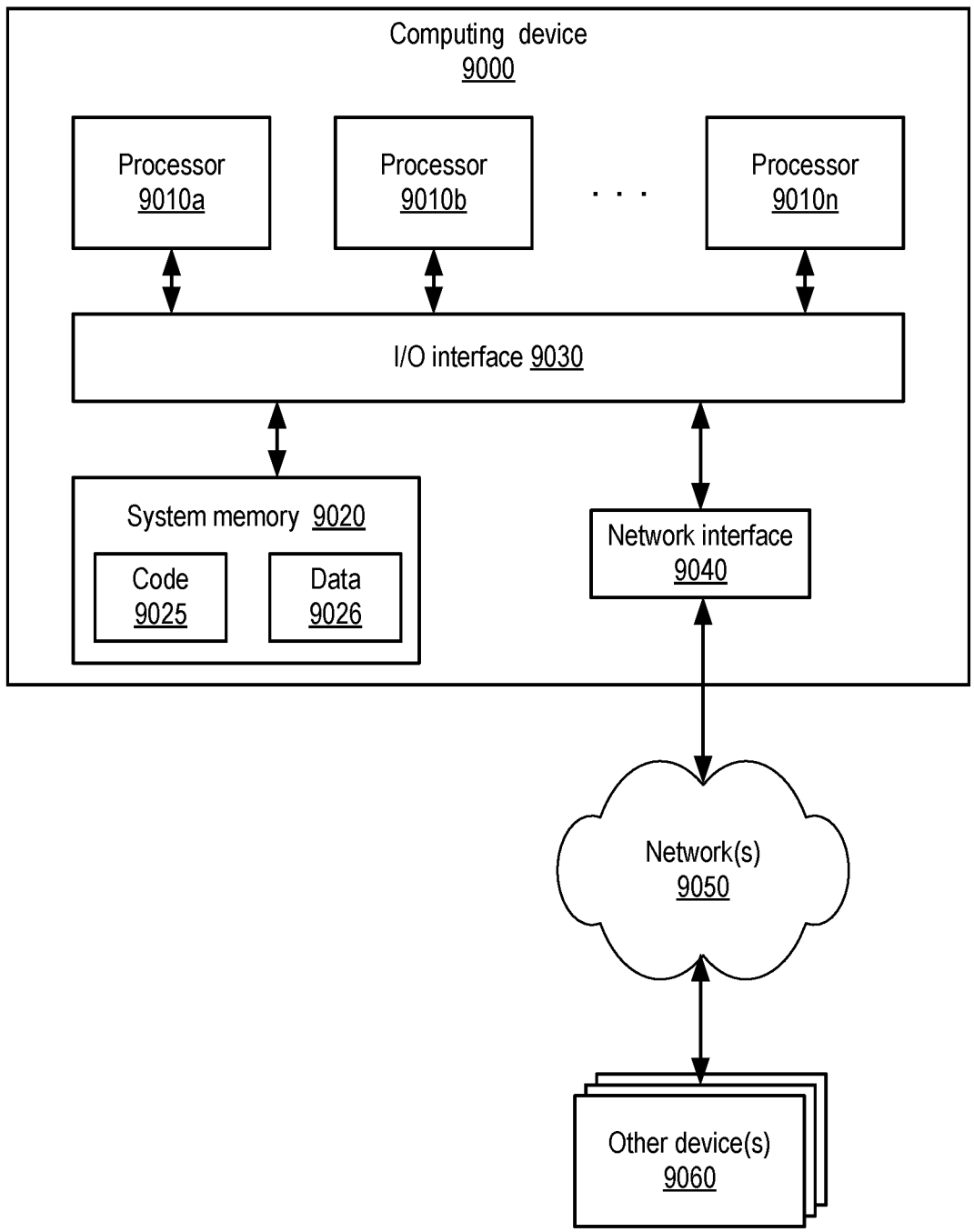
FIG. 20 is a block diagram illustrating an example computing device that may be used in at least some embodiments.

In at least some embodiments, a server that implements the types of techniques described herein (e.g., various functions of a data quality assessment service, an MLS and/or other services of a provider network), may include a general-purpose computer system that includes or is configured to access one or more computer-accessible media. FIG. 20 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 19, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 19. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 20 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices:
determine, at a service of a provider network, that an explanatory data set for a common prediction generated by a machine learning model with respect to a plurality of data records is to be provided, wherein a prediction corresponding to an individual data record is based at least in part on analysis of a first text attribute of the individual data record, and wherein the first text attribute comprises a plurality of tokens;

identify, from respective first text attributes of the plurality of data records, a respective collection of semantically related token groups, wherein identification of a particular collection of semantically related token groups from a particular first text attribute of a particular data record of the plurality of data records comprises pruning a parse tree representation of the particular first text attribute using a set of heuristics;

assign, to individual ones of the semantically related token groups identified from the particular data record, a respective record-level prediction influence score with respect to the common prediction generated for the particular data record;

compute, from respective record-level prediction influence scores assigned to a particular semantically related token group identified from individual data records of the plurality of data records, an aggregate prediction influence score for the particular semantically related token group; and cause an explanatory data set for the common prediction to be presented via one or more programmatic interfaces of the service, wherein the explanatory data set is based at least in part on respective aggregate prediction influence scores computed for one or more semantically related token groups including the particular semantically related token group.

2. The system as recited in claim 1, wherein the one or more computing devices include further instructions that upon execution on or across the one or more computing devices:
obtain an indication, via a programmatic interface of the service, of a granularity at which the semantically related token groups are to be identified.

3. The system as recited in claim 1, wherein the one or more computing devices include further instructions that upon execution on or across the one or more computing devices:
obtain a request, via a programmatic interface of the service, indicating the common prediction for which the explanatory data set is to be provided.

4. The system as recited in claim 1, wherein the explanatory data set is presented via a visualization in which one or more visual cues indicate respective magnitudes of the individual ones of the aggregate prediction influence scores of semantically related token groups, wherein a visual cue of the one or more visual cues comprises one of: a font size used for displaying a related token group, or a color used for displaying a related token group.

5. The system as recited in claim 1, wherein to assign the record-level prediction influence scores, the one or more computing devices include further instructions that upon execution on or across the one or more computing devices:
utilize a SHAP (Shapley additive explanation) based algorithm.

6. A computer-implemented method, comprising:
determining that an explanatory data set for a common prediction generated by a machine learning model with respect to a plurality of data records is to be provided, wherein a prediction corresponding to an individual data record is based at least in part on analysis of a first text attribute of the individual data record, wherein the first text attribute comprises a plurality of tokens;

identifying, from respective first text attributes of the plurality of data records, a respective collection of related token groups, wherein identification of a particular collection of related token groups from a particular first text attribute of a particular data record of the plurality of data records comprises analyzing a tree representation of the particular first text attribute, wherein leaf nodes of the tree representation comprise one or more tokens of the particular first text attribute;

assigning, to individual ones of the related token groups identified from the particular data record, a respective record-level prediction influence score with respect to the common prediction generated for the particular data record;

determining, from respective record-level prediction influence scores assigned to a particular related token group identified from individual data records of the plurality of data records, an aggregate prediction influence score for the particular related token group; and causing an explanatory data set for the common prediction to be presented, wherein the explanatory data set is based at least in part on respective aggregate prediction influence scores computed for one or more related token groups including the particular related token group.

7. The computer-implemented method as recited in claim 6, wherein the tree representation comprises a parse tree.

8. The computer-implemented method as recited in claim 6, wherein analyzing the tree representation comprises pruning the tree representation.

9. The computer-implemented method as recited in claim 8, wherein the pruning comprises a bottom-up traversal of the tree representation during which token groups corresponding to nodes of the tree representation are merged until token group types of at least a subset of remaining leaf nodes of the tree representation belong to a set of target token group types.

10. The computer-implemented method as recited in claim 9, wherein the set of target token group types comprises noun phrases and verb phrases.

11. The computer-implemented method as recited in claim 6, wherein analyzing the tree representation comprises merging at least some pairs of token groups based on a total number of tokens in individual token groups of the pairs of token groups.

12. The computer-implemented method as recited in claim 6, wherein analyzing the tree representation comprises determining not to merge a pair of token groups based at least in part on a location, with respect to the pair of token groups, of (a) a conjunction (b) a preposition, or (c) a punctuation symbol.

13. The computer-implemented method as recited in claim 6, further comprising:
providing, by a service of a provider network in response to a programmatic request from a client, access via a programmatic interface to a software container in which analysis of the tree representation is performed.

14. The computer-implemented method as recited in claim 6, wherein assigning a record-level prediction influence score to the particular related token group with respect to the particular data record comprises combining respective prediction influence scores of multiple occurrences of the particular related token group within the first text attribute of the particular data record.

15. The computer-implemented method as recited in claim 6, wherein assigning the record-level prediction influence score comprises utilizing a SHAP (Shapley additive explanation) based algorithm.

16. One or more non-transitory computer-accessible storage media storing program instructions that when executed on or across one or more processors:
- determine that an explanatory data set for a common prediction generated by a machine learning model with respect to a plurality of data records is to be provided, wherein a prediction corresponding to an individual data record is based at least in part on analysis of a first text attribute of the individual data record, wherein the first text attribute comprises a plurality of tokens;
- identify, from respective first text attributes of the plurality of data records, a respective collection of related token groups;
- assign, to individual ones of the related token groups identified from a particular data record, a respective record-level prediction influence score with respect to the common prediction generated for the particular data record;
- determine, from respective record-level prediction influence scores assigned to a particular related token group identified from individual data records of the plurality of data records, an aggregate prediction influence score for the particular related token group; and
- cause an explanatory data set for the common prediction to be presented, wherein the explanatory data set is based at least in part on respective aggregate prediction influence scores computed for one or more related token groups including the particular related token group.

17. The one or more non-transitory computer-accessible storage media as recited in claim 16, wherein to identify the related token groups, the one or more non-transitory computer-accessible storage media store further program instructions that when executed on or across one or more processors:
- generate a tree representation of the first text attribute; and
- prune the tree representation.

18. The one or more non-transitory computer-accessible storage media as recited in claim 16, wherein to determine the aggregate prediction influence score, the one or more non-transitory computer-accessible storage media store further program instructions that when executed on or across one or more processors:
- compute a mean, a median, or a percentile-based function of the respective record-level prediction influence scores.

19. The one or more non-transitory computer-accessible storage media as recited in claim 16, storing further program instructions that when executed on or across one or more processors:
- determine, based at least in part on input received via a programmatic interface, a set of stop words; and
- verify that a related token group represented in the explanatory data set does not include members of the set of stop words.

20. The one or more non-transitory computer-accessible storage media as recited in claim 16, storing further program instructions that when executed on or across one or more processors:
- determine, based at least in part on input received via a programmatic interface, a first token grouping granularity at which record-level explanatory data is presented with respect to predictions for individual ones of the plurality of data records, and a second token grouping granularity at which explanatory data is presented with respect to the common prediction.

* * * * *